(12) United States Patent
Sunaga et al.

(10) Patent No.: US 6,270,224 B1
(45) Date of Patent: Aug. 7, 2001

(54) OPTICAL SYSTEM AND OPTICAL APPARATUS HAVING THE SAME

(75) Inventors: Toshihiro Sunaga, Kawasaki; Takeshi Akiyama, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/396,881

(22) Filed: Sep. 16, 1999

(30) Foreign Application Priority Data

Sep. 21, 1998 (JP) .................................................. 10-284802
Sep. 14, 1999 (JP) .................................................. 11-260240

(51) Int. Cl.$^7$ .................................................. G02B 5/08
(52) U.S. Cl. .......................... 359/857; 359/858; 359/859; 359/363; 359/364
(58) Field of Search ..................................... 359/857, 858, 359/859, 363, 364, 365, 366, 726, 729, 730, 731

(56) References Cited

U.S. PATENT DOCUMENTS

| | | | |
|---|---|---|---|
| 4,812,030 | 3/1989 | Pinson | 359/859 |
| 4,993,818 | 2/1991 | Cook | 359/366 |
| 5,933,283 | * 8/1999 | Hamano | 359/687 |
| 5,978,154 | * 11/1999 | Hashimura | 359/691 |

FOREIGN PATENT DOCUMENTS

| | | |
|---|---|---|
| 0730179 | * 9/1996 | (EP) . |
| 0 730 169 | 9/1996 | (EP) . |
| 0 730 180 | 9/1996 | (EP) . |
| 0 790 513 | 8/1997 | (EP) . |
| 0 802 436 | 10/1997 | (EP) . |
| 8-292368 | 11/1996 | (JP) . |
| 8-292372 | 11/1996 | (JP) . |

* cited by examiner

*Primary Examiner*—Mohammad Sikder
(74) *Attorney, Agent, or Firm*—Fitzpatrick, Cella, Harper & Scinto

(57) ABSTRACT

The optical system provided with a first optical part disposed most adjacent to the object side, the optical part having three or more optical surfaces, of which at least one is a reflecting surface, and an aperture stop disposed more adjacent to the image side than the first optical part, wherein when the spacing from the first optical surface to the third optical surface as counted from the object side of the first optical part is defined as D and the spacing from the first optical surface to the entrance pupil at an azimuth ξ degrees is defined as X(ξ), the following condition is satisfied:

$(X(0)+X(90))/2 < D$.

The specification also discloses an optical apparatus provided with such optical system.

11 Claims, 17 Drawing Sheets

OPTICAL SYSTEM AND OPTICAL APPARATUS HAVING THE SAME

BACKGROUND OF THE INVENTION

1. Field of the Invention

This invention relates to an optical system and an optical apparatus using the same, and is suitable, for example, for a video camera, a still video camera, a copying apparatus, etc.

2. Related Background Art

An optical system comprised of only a refracting lens is known as an image pickup optical system having a zooming function. In this optical system, a spherical or rotation-symmetrical aspherical refracting lens is disposed rotation-symmetrically with respect to the optical axis thereof.

There is also known the zooming technique of changing the imaging magnification (focal length) of an optical system by moving a plurality of reflecting surfaces constituting a mirror optical system relative to one another.

For example, U.S. Pat. No. 4,812,030 discloses a technique of affecting the focal length change of an optical system by changing the interval from a concave mirror 101 to a convex mirror 102 and the interval from the convex mirror 102 to an image surface 103 relative to each other in the construction of a Cassegrainian reflector shown in FIG. 17 of the accompanying drawings.

FIG. 18 of the accompanying drawings shows another embodiment disclosed in the aforementioned patent. In FIG. 18, an object light beam 128 from an object is incident on a first concave mirror 121, is reflected by the surface thereof, becomes a convergent light beam that travels toward the object side and is incident on a first convex mirror 122, is reflected toward the imaging plane side thereby and becomes a substantially parallel light beam incident on a second convex mirror 124, is reflected by the surface thereof and becomes a divergent light beam incident on a second concave mirror 125, is reflected thereby and becomes a convergent light beam, and is imaged on an image surface 127.

In this construction, the interval between the first concave mirror 121 and the first convex mirror 122 is change d and t he interval between the second convex mirror 124 and the second concave mirror 125 is changed to thereby effect zooming and change the focal length of the mirror optical system of the entire system.

Also, in U.S. Pat. No. 4,993,818, the image formed by the Cassegrainian reflector shown in FIG. 17 is secondary-imaged by another mirror optical system provided at the rear stage, and the imaging magnification of this secondary imaging mirror optical system is changed to thereby effect the focal length change of the entire optical system.

These optical systems of the reflection type have required a great number of constituent parts, and to obtain necessary optical performance, it has been necessary to assemble the respective optical parts with good accuracy. Particularly, the relative positional accuracy of the reflecting mirrors is severe and therefore, the adjustment of the position and angle of each reflecting mirror has been requisite.

As a method of solving this problem, there has heretofore been proposed, for example, a method of making the mirror systems into a block to thereby avoid the assembly error of the optical parts caused during the assembly thereof.

FIG. 19 of the accompanying drawings shows an embodiment of a reflecting optical system disclosed in Japanese Laid-Open Patent Application No. 8-292368. In FIG. 19, a light beam from an object passes through a first surface R1 of a stop, and the light beam enters a first optical element B1. In the first optical element B1, the light beam is refracted by a second surface R2, is reflected by a third surface R3 and a fourth surface R4, is refracted by a fifth surface R5, and emerges from the first optical element B1. At this time, the light beam is primary-imaged on an intermediate imaging plane near the fourth surface.

Next, the light beam enters a second optical element B2. In the second optical element B2, the light beam is refracted by a sixth surface R6, is reflected by a seventh surface R7 and an eighth surface R8, is refracted by a ninth surface R9 and emerges from the second optical element B2. At this time, a pupil is formed near the seventh surface R7 in the second optical element B2. The light beam which has emerged from the second optical element B2 is finally imaged on an image surface P (the image pickup surface of an image pickup medium such as a CCD).

In this embodiment, during focal length change, the first optical element B1 is once moved in Z plus direction from the wide angle end toward the telephoto end, and thereafter is moved in Z minus direction. The second optical element B2 is moved in Z minus direction from the wide angle end toward the telephoto end. The image surface P is not moved during focal length change. The interval between the first optical element B1 and the second optical element B2 is narrowed by the focal length change from the wide angle end toward the telephoto end, and the interval between the second optical element B2 and the image surface P is widened.

In this invention, use is made of a plurality of optical elements in which a plurality of curved surfaces and flat reflecting surfaces are formed integrally with one another, and the relative position of at least two of the plurality of optical elements is appropriately changed to effect zooming to thereby achieve the downsizing of the entire mirror optical system and yet alleviate the disposition accuracy (assembly accuracy) of the reflecting mirrors which is liable to be in the mirror optical system.

Also, by adopting a construction in which a stop is disposed on the side of the optical system which is most adjacent to the object and in this optical system, the object image is formed at least once, there is a reduction in the effective diameter of the optical system in spite of being a zoom optical system of the reflection type having a wide angle of view, appropriate reflective power is given to a plurality of reflecting surfaces constituting the optical elements, and the reflecting surfaces constituting each optical element are eccentrically disposed to thereby bend the optical path in the optical system into a desired shape and achieve the shortening of the full length of the optical system in a predetermined direction.

It is often the case with the prior-art optical system having only a refracting optical element that the entrance pupil lies deep in the optical system, and there has been the problem that the greater the interval to the entrance surface located most adjacent to the object side as viewed from the stop, the greater becomes the effective diameter of the light beam on the entrance surface with the enlargement of the angle of view.

Also, the mirror optical systems having the focal length changing function disclosed in the aforementioned U.S. Pat. Nos. 4,812,030 and 4,993,818 have both required a great number of constituent parts including a reflecting mirror and an imaging lens, and to obtain necessary optical performance, it has been necessary to assemble the respective optical parts with good accuracy.

Also, particularly the relative positional accuracy of the reflecting mirrors becomes severe and, therefore, it has been necessary to affect the adjustment of the position and angle of each reflecting mirror.

Also, the optical system proposed in the aforementioned Japanese Laid-Open Patent Application No. 8-292372 has a feature that the downsizing of the entire mirror optical system is achieved and yet the disposition accuracy (assembly accuracy) of the reflecting mirrors which is liable to be in the mirror optical system is alleviated. In the optical system of this patent application, the positions of the stop and the entrance pupil are the same and therefore, to make F number constant during zooming, it has been necessary to change the diameter of the stop. Also, if the F number is determined, the diameter of the stop is determined, and when the image size is small as in a still video camera, the diameter of the small stop necessarily becomes small.

SUMMARY OF THE INVENTION

In view of the above-described prior art, the present invention has as its object to provide an optical system which prevents a reduction in the amount of marginal light and prevents the diameter of a small stop from becoming extremely small and yet makes the F number substantially constant even if the diameter of the stop is fixed during zooming and which achieves downsizing to the same degree as the optical system of a pre-stop in which a stop is provided most adjacent to the object side.

To achieve the above object, the present invention is an optical system having a first optical portion disposed most adjacent to the object side, and an aperture stop disposed more adjacent to the image side than it, characterized in that the optical system is constructed so that the entrance pupil may be located near a first surface of the first optical portion which is the surface of the optical system which is most adjacent to the object side.

DESCRIPTION OF THE PREFERRED EMBODIMENTS

Before starting the description of the present embodiment, description will be made of the way of representing the constituent numerical data of the embodiment and items common to the entire embodiment.

Figure 16:
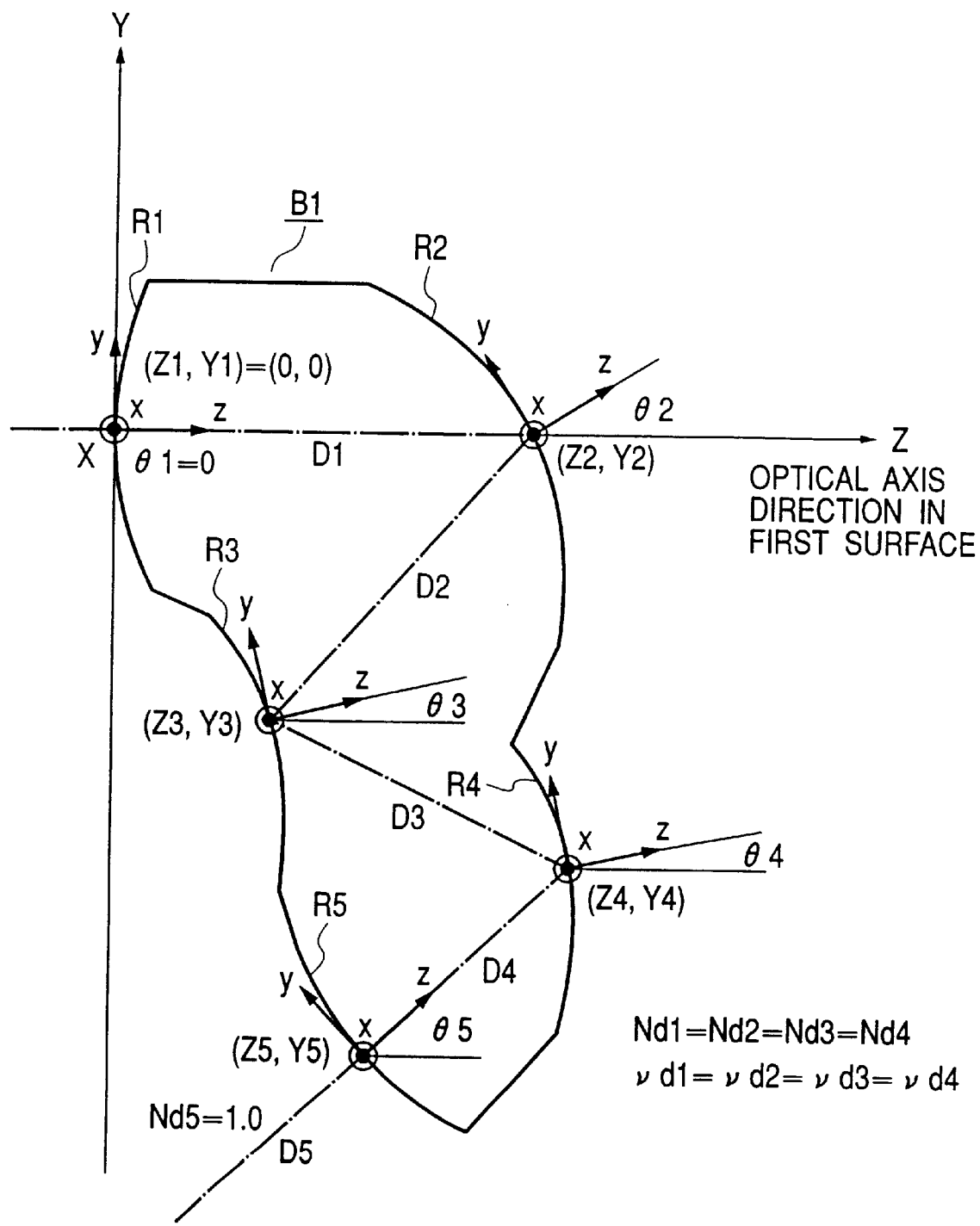
FIG. 16 is an illustration of a coordinate system in an embodiment of the present invention.
Figure 17:
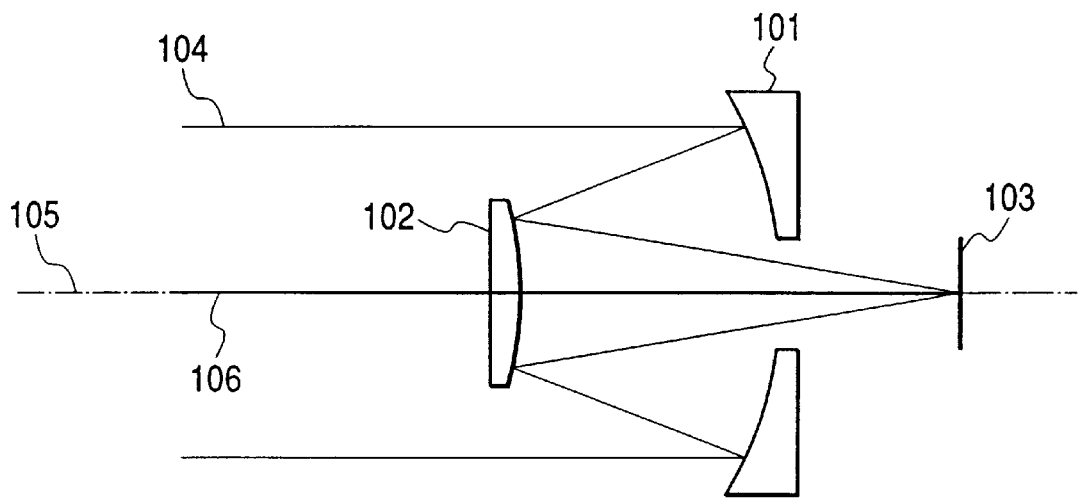
FIG. 17 shows the basic construction of a Cassegrainian reflector.
Figure 18:
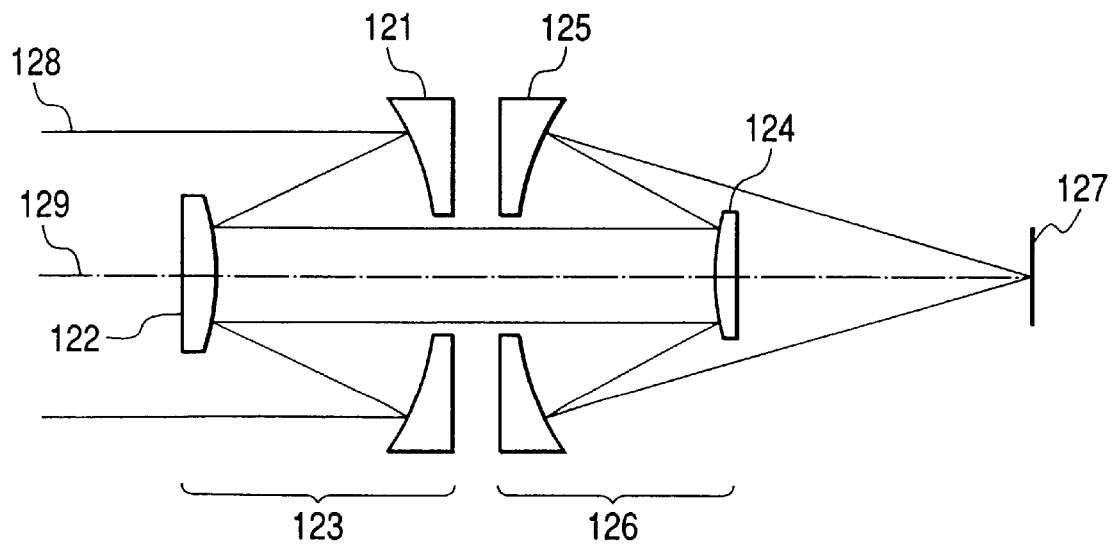
FIG. 18 is a schematic view of a prior-art optical system using a reflecting mirror.
Figure 19:
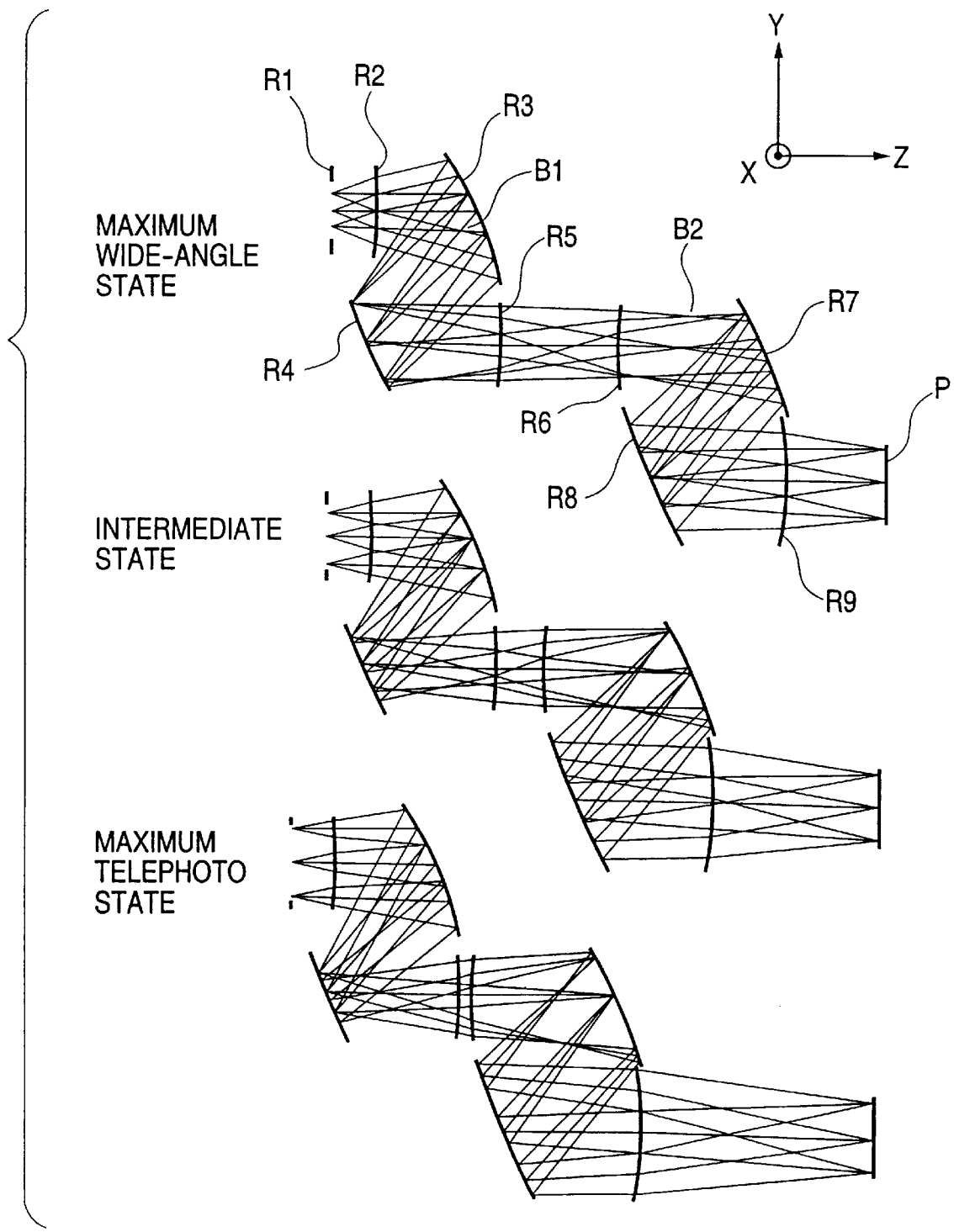
FIG. 19 shows a photographing optical system having a curvature in a prior-art prism reflecting surface.

FIG. 16 is an illustration of a coordinate system which defines the construction data of the optical system of the present invention. In the embodiments of the present invention, the ith surface along a ray of light (indicated by dot-and-dash line in FIG. 16 and called the reference axis ray) travelling from the object side to an image surface in the embodiments of the present invention is defined as the ith surface.

In FIG. 16, the first surface R1 is a refracting surface, the second surface R2 is a reflecting surface tilted relative to the first surface R1, the third surface R3 and the fourth surface R4 are reflecting surfaces shifted and tilted relative to their preceding surfaces, and the fifth surface R5 is a refracting surface shifted and tilted relative to the fourth surface R4. The first surface R1 to the fifth surface R5 are constructed on an optical element comprised of a medium such as glass or plastic, and in FIG. 16, the optical element is an optical element B1.

Accordingly, in the construction of FIG. 16, the medium from an object surface, not shown, to the first surface R1 is comprised of air, the medium from the first surface R1 to the fifth surface R5 is comprised of a certain common medium, and the medium from the fifth surface R5 to the sixth surface R6, not shown, is comprised of air.

In the optical system of the present embodiment, the surfaces constituting the optical system do not have a common optical axis. So, in the embodiment of the present invention, an absolute coordinate system having the center of the first surface as the origin is first set.

In the described embodiments of the present invention, the central point of the first surface (the point at which the reference axis ray intersects with the first surface) is defined as the origin and also, the route of the ray (reference axis ray) passing through the center of a stop and the center of the final imaging plane is defined as the reference axis of the optical system. Further, the reference axis in the present embodiment has a direction. The direction is a direction in which the reference axis ray travels during imaging.

While in the embodiments of the present invention, the reference axis which is the reference of the optical system is set as described above, an axis convenient for optical design, adjusting the aberrations or expressing the shape of each surface constituting the optical system can be adopted as the axis which is the reference of the optical system. Generally, however, the route of a ray of light passing through the center of the image surface and the stop or the entrance pupil or the exit pupil or the center of the first surface of the optical system or the center of the last surface is set as the reference axis which is the reference of the optical system.

That is, in the embodiments of the present invention, the route along which the ray (reference axis ray) passing through the center of the first surface to the center of the last imaging plane is refracted and reflected by each refracting surface and each reflecting surface is set as the reference axis. The order of the surfaces is set to the order in which the reference axis ray is subjected to refraction and reflection.

Accordingly, the reference axis finally arrives at the center of the image surface while changing its direction along the set order of the surfaces in accordance with the law of refraction or reflection.

All of the tilted surfaces constituting the optical system of each embodiment of the present invention are basically tilted in the same plane. So, the axes of an absolute coordinate system are defined as follows:

Z-axis: a straight line passing through the origin and the center of the object surface. The direction from the object surface toward the first surface R1 is positive.

Y-axis: a straight line passing through the origin and forming counter-clockwisely 90° with respect to the Z-axis in the tilt plane (the plane of the drawing sheet of FIG. 16) as viewed from above the plane of the drawing sheet.

X-axis: a straight line passing through the origin and perpendicular to the Z-axis and the Y-axis (straight line perpendicular to the plane of the drawing sheet of FIG. 16).

Also, to represent the surface shape of the ith surface constituting the optical system, it is easier to recognize the shape to set a focal coordinate system having as the origin a point at which the reference axis and the ith surface intersect with each other and represent the surface shape of that surface by the local coordinate system than to represent the shape of that surface by the absolute coordinate system and therefore, the surface shape of the ith surface is represented by the local coordinate system.

Also, the tilt angle of the ith surface in YZ plane is represented by an angle $\theta_i$ (unit being °) in which the counter-clockwise direction with respect to the Z-axis of the absolute coordinate system as viewed from above the plane of the drawing sheet is positive. Consequently, in the embodiment of the present invention, the origin of the local coordinates of each surface is on the YZ plane in FIG. 16. There is no eccentricity of the surfaces in the XZ and XY planes. Further, the y- and z-axis of the local coordinates (x, y, z) of the ith surface are inclined by an angle $\theta_i$ in the YZ plane with respect to the absolute coordinate system (X, Y, Z), and specifically are set as follows:

Z-axis: a straight line passing through the origin of the local coordinates and forming counter-clockwisely an angle $\theta_i$ in the YZ plane with respect to z direction as viewed from above the plane of the drawing sheet.

y-axis: a straight line passing through the origin of the local coordinates and forming counter-clockwisely 90° in the YZ plane with respect to z direction as viewed from above the plane of the drawing sheet.

x-axis: a straight line passing through the origin of the local coordinates and perpendicular to the YZ plane.

Also, Di represents a scalar amount representing the spacing between the ith surface and the origin of the local coordinates of the (i+1)th surface, and Ndi and vdi represent the refractive index and Abbe number, respectively, of the medium between the ith surface and the (i+1)th surface.

Also, the optical system of the embodiment of the present invention changes the focal length of the whole (effects focal length change) by the movement of a plurality of optical elements. In a specific embodiment of the present invention which will be described later, there are shown cross-sectional views and numerical value data of the optical system at three positions, i.e., the wide angle end (W), the telephoto end (T) and the intermediate position (M).

Here, when in the optical element of FIG. 16, the optical element is moved in the YZ plane, it is the origin (Yi, Zi) of the local coordinates representing the position of each surface that the value is changed at each focal length changing position, but in the embodiment of the present invention, the optical element moved for focal length change is only moved in Z direction and therefore, the coordinate value Zi is represented by Zi(W), Zi(M) and Zi(T) in the order of the wide-angle state, the intermediate state and the telephoto state of the optical system.

The coordinate value of each surface is shown as the value at the wide angle end, and at the intermediate position and the telephoto end, the differences from the wide angle end are described. Specifically, they are represented by the following expressions if the amounts of movement at the intermediate position (M) and the telephoto end (T) relative to the wide angle end (W) are a and b, respectively.

$Zi(M)=Zi(W)+a$ $Zi(T)=Zi(W)+b$

As regards the signs of a and b, the case where each surface is moved in Z plus direction is positive, and the case where each surface is moved in Z minus direction is negative. Also, the surface interval Di changed with this movement is a variable, and the values at respective focal length change positions will be collectively shown in a table below.

The optical system of the embodiment of the present invention has a spherical surface and a rotation-asymmetrical aspherical surface. As regards the spherical surface portion, the radius of curvature Ri thereof is written as the spherical shape. The sign of the radius of curvature Ri is minus when the center of curvature is on the first surface side along the reference axis (dot-and-dash line in FIG. 16) travelling from the first surface to the image surface, and is plus when the center of curvature is on the imaging plane side.

The spherical surface is of a shape represented by the following expression:

$$Z = \frac{(x^2 + y^2)/Ri}{1 + \{1 - (x^2 + y^2)/Ri\}^{1/2}}$$

Also, the optical system of the present invention has at least one rotation-asymmetrical aspherical surface, the shape of which is represented by the following expression:

$$Z = C02y^2 + C20x^2 + C03y^3 + C21x^2y + C04y^4 +$$
$$C22x^2y^2 + C40x^4 + C05y^5 + C23x^2y^3 +$$
$$C41x^4y + C06y^6 + C24x^2y^4 + C42x^4y^2 + C60x^6$$

The above curved surface expression has only terms of even number orders with respect to x and therefore, the curved surface prescribed by the above curved surface expression is of a surface-symmetrical shape having the yz plane as the symmetry surface. Further, it represents a shape symmetrical with respect to the xz plane when the following condition is satisfied:

$$C03=C21=t=0$$

Further, it represents a rotation-symmetrical shape when the following condition are satisfied:

$$C02=C20 \ C04=C40=C22/2$$

$$C06=C60=C24/3=C42/3$$

It is a rotation-asymmetrical shape when the above conditions are not satisfied.

In each embodiment of the present invention, the horizontal half angle of view uY is the maximum angle of view of a light beam entering the surface R1 in the YZ plane of FIG. 16, and the vertical half angle of view uX is the maximum angle of view of a light beam entering the surface R1 in the XZ plane of FIG. 16. Also, the diameter of the stop is shown as the aperture diameter. This is related to the brightness of the optical system.

Also, the effective image range on the image surface is shown as the image size. The image size is represented by a rectangular area in which the size in the y direction of the local coordinates is horizontal and the size in the x direction of the local coordinates is vertical.

The lateral aberration graph of each embodiment will now be described. The lateral aberration graph shows the lateral aberration of a light beam of an angle of incidence of which the vertical angle of incidence and the horizontal angle of incidence onto the surface R1 are (0, −uY), (0, 0), (0, uY), (uX, −uY), (uX, 0) and (uX, uY), respectively, with respect to the states of the wide angle end (W), the intermediate position (M) and the telephoto end (T) of each embodiment. In the lateral aberration graph, the axis of abscissa represents the incidence height to the pupil, and the axis of ordinates represents the amount of aberration. In each embodiment, basically each surface is of a surface-symmetrical shape having the yz plane as the symmetry surface and therefore, in the lateral aberration graph as well, the plus and minus directions of the vertical angle of view are the same, and for the simplification of showing, the lateral aberration graph in the minus direction is not shown.

Description will now be made of the most characteristic point of the optical system of the present invention common to the respective embodiments.

The optical system of the present invention is an optical system having a first optical portion disposed most adjacent to the object side, and an aperture stop disposed more adjacent to the image side than it, and the optical system is constructed so that the entrance pupil may be located near the first surface of the first optical portion which is the surface of the optical system most adjacent to the object side, whereby a reduction in the amount of marginal light is prevented and the diameter of the small stop is presented from becoming extremely small. Yet the F number is made substantially constant even if the aperture diameter is fixed during zooming. Also, the downsizing of the first optical portion to the same extent as the system provided with a stop on the object side of the first optical portion, and further the downsizing of the entire optical system are realized.

Specifically describing the position of the entrance pupil, the optical system is designed such that when the spacing from the first optical surface (first surface) as counted from the object side of the first optical portion to the third optical surface (third surface) is defined as D (positive value) and the spacing from the first surface to the entrance pupil at an azimuth $\xi$ degree is defined as $X(\xi)$, (Note that $X(\xi)$ assumes a positive value when the entrance pupil is positioned more at the image side than the first surface, and a negative value when the entrance pupil is positioned more at the object side than the first surface.) the condition that $$(X(0)+X(90))/2<D \tag{1}$$

is satisfied, that is, the entrance pupil is located within ±D from the first surface.

While in the present embodiment, the interior of the plane containing the reference axis ray bent by each optical surface, i.e., the YZ plane, is defined as $\xi=0$ (degree) for the sake of convenience, the present invention is not limited to this definition. That is, the left side of the above-mentioned conditional expression means that the average position of the entrance pupil in any two planes orthogonal to each other exists within the distance D from the first surface of the first optical portion.

Each embodiment of the present invention will now be specifically described.

Figure 1:
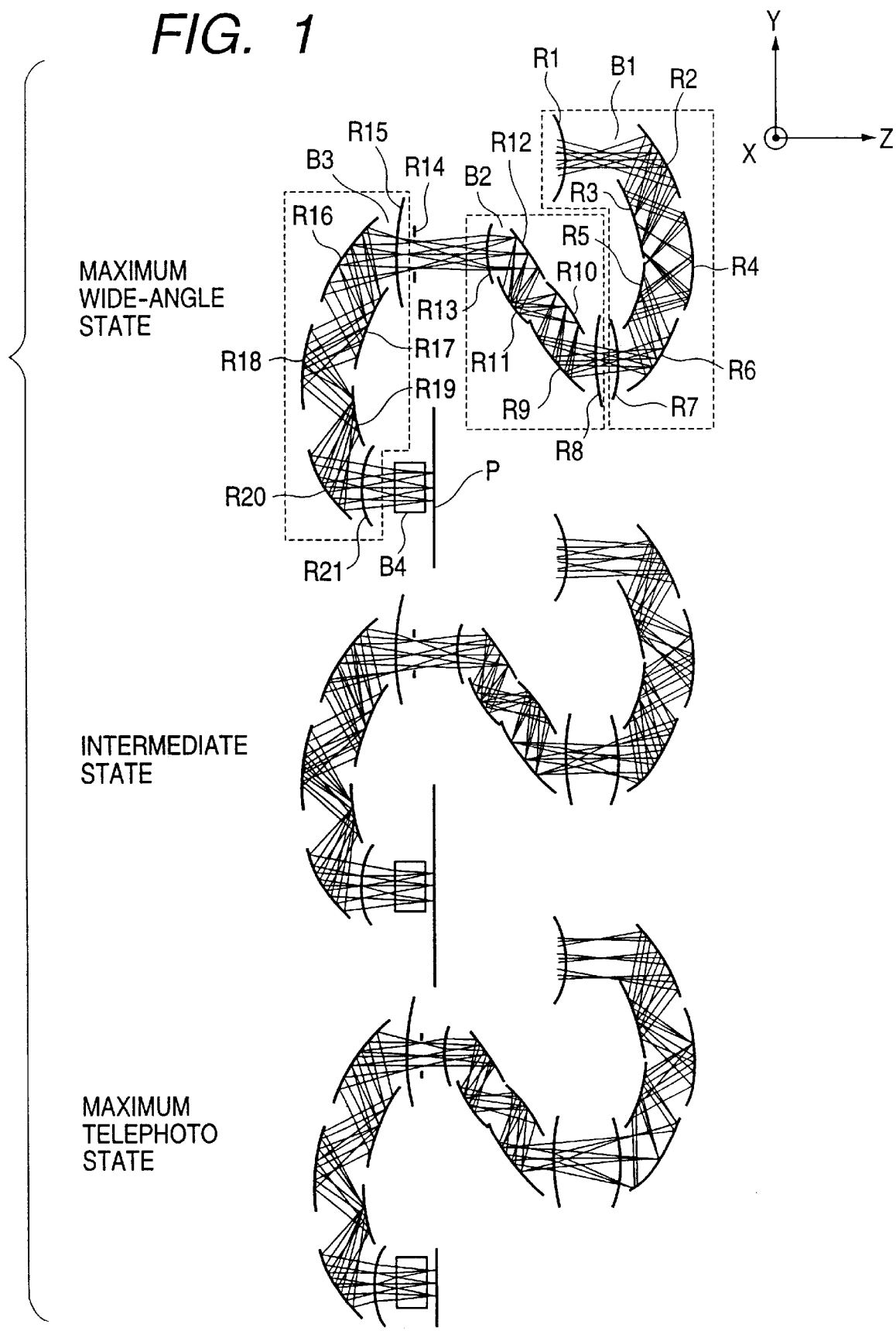
FIG. 1 is an optical cross-sectional view of Embodiment 1 of the present invention in YZ plane.

FIG. 1 is an optical cross-sectional view of Embodiment 1 of the present invention in YZ plane. This embodiment is an image pickup optical system of a three-unit zoom lens of a variable power ratio of about 3 times comprising three solid type optical elements B1, B2 and B3. The construction data thereof are shown below.

|  | wide angle end | intermediate | telephoto end |
|---|---|---|---|
| horizontal half angle of view | 26.3 | 13.9 | 9.3 |
| vertical half angle of view | 20.3 | 10.5 | 7.0 |
| stop diameter | 1.82 | 1.82 | 1.82 | image size horizontal × vertical 3.554 mm × 2.666 mm

| i | Yi | Zi(W) | θi | Di | Ndi | vdi | |
|---|---|---|---|---|---|---|---|
| first optical element: B1 | | | | | | | |
| 1 | 0.00 | 1.00 | 0.00 | 12.80 | 1.57250 | 57.76 | refracting surface |
| 2 | 0.00 | 13.80 | 32.91 | 9.00 | 1.57250 | 57.76 | reflecting surface |
| 3 | −8.21 | 10.11 | 16.95 | 9.00 | 1.57250 | 57.76 | reflecting surface |
| 4 | −12.97 | 17.75 | 0.14 | 8.50 | 1.57250 | 57.76 | reflecting surface |
| 5 | −17.50 | 10.56 | −19.56 | 8.50 | 1.57250 | 57.76 | reflecting surface |
| 6 | −25.55 | 13.28 | −35.53 | 5.20 | 1.57250 | 57.76 | reflecting surface |
| 7 | −25.58 | 8.08 | 0.28 | variable | 1 | | refracting surface |

-continued second optical element: B2

| | | | | | | | |
|---|---|---|---|---|---|---|---|
| 8 | −25.59 | 5.08 | 0.28 | 5.50 | 1.57250 | 57.76 | refracting surface |
| 9 | −25.62 | −0.42 | 38.01 | 7.20 | 1.57250 | 57.76 | reflecting surface |
| 10 | −18.64 | 1.35 | 37.25 | 7.20 | 1.57250 | 57.76 | reflecting surface |
| 11 | −18.48 | −5.84 | 33.44 | 6.80 | 1.57250 | 57.76 | reflecting surface |
| 12 | −12.17 | −3.31 | 34.24 | 5.50 | 1.57250 | 57.76 | reflecting surface |
| 13 | −12.21 | −8.81 | 0.37 | variable | 1 | | refracting surface | stop

| | | | | | | | |
|---|---|---|---|---|---|---|---|
| 14 | −12.27 | −18.32 | 0.37 | variable | 1 | | stop | third optical element: B3

| | | | | | | | |
|---|---|---|---|---|---|---|---|
| 15 | −12.28 | −20.32 | 0.37 | 6.60 | 1.57250 | 57.76 | refracting surface |
| 16 | −12.33 | −26.92 | −35.35 | 9.60 | 1.57250 | 57.76 | reflecting surface |
| 17 | −21.41 | −23.80 | −20.80 | 10.00 | 1.57250 | 57.76 | reflecting surface |
| 18 | −26.33 | −32.51 | −6.23 | 9.50 | 1.57250 | 57.76 | reflecting surface |
| 19 | −32.68 | −25.44 | 11.22 | 10.00 | 1.57250 | 57.76 | reflecting surface |
| 20 | −41.70 | −29.77 | −32.17 | 5.00 | 1.57250 | 57.76 | reflecting surface |
| 21 | −41.70 | −24.77 | −0.04 | variable | 1 | | refracting surface | optical correcting plate

| | | | | | | | |
|---|---|---|---|---|---|---|---|
| 22 | −41.69 | −20.72 | 0.00 | 4.00 | 1.51633 | 64.15 | refracting surface |
| 23 | −41.69 | −16.72 | 0.00 | 1.00 | 1 | | refracting surface | image surface

| | | | | | | | |
|---|---|---|---|---|---|---|---|
| P | −41.69 | −15.72 | −0.00 | | 1 | | image surface |

| | wide angle end | intermediate | telephoto end |
|---|---|---|---|
| D7 | 3.00 | 6.82 | 8.75 |
| D13 | 9.51 | 5.38 | 2.71 |
| D14 | 2.00 | 2.57 | 2.00 |
| D21 | 4.05 | 4.31 | 3.00 |

| | |
|---|---|
| D1 to 7 surfaces | Zi(M) = Zi(W) − 0.00  Zi(T) = Zi(W) − 0.00 |
| D8 to 13 surfaces | Zi(M) = Zi(W) − 3.82  Zi(T) = Zi(W) − 5.75 |
| D14 to 14 surfaces | Zi(M) = Zi(W) + 0.31  Zi(T) = Zi(W) + 1.05 |
| D15 to 21 surfaces | Zi(M) = Zi(W) − 0.26  Zi(T) = Zi(W) + 1.05 |
| D22 surface | Zi(M) = Zi(W)  Zi(T) = Zi(W) | spherical surface shape

| | |
|---|---|
| surface R1 | $r_1$ = −10.000 |
| surface R7 | $r_7$ = −15.561 |
| surface R8 | $r_8$ = 34.119 |
| surface R13 | $r_{13}$ = 8.858 |
| surface R15 | $r_{15}$ = 26.889 |
| surface R21 | $r_{21}$ = 9.484 | aspherical surface shape

| | | | |
|---|---|---|---|
| surface R2 | C02 = −2.12342e−02 | C20 = −4.20269e−02 | |
| | C03 = 1.81374e−04 | C21 = 9.17118e−05 | |
| | C04 = 1.85211e−05 | C22 = −2.40729e−05 | C40 = −6.48161e−05 |
| surface R3 | C02 = −7.61864e−03 | C20 = −9.02818e−02 | |
| | C03 = 1.92614e−04 | C21 = −1.72415e−03 | |
| | C04 = −2.70968e−04 | C22 = −1.24810e−03 | C40 = 1.09034e−02 |
| surface R4 | C02 = −2.43274e−02 | C20 = −4.36675e−02 | |
| | C03 = 6.68845e−05 | C21 = −5.93107e−04 | |
| | C04 = −6.16416e−05 | C22 = −1.24891e−04 | C40 = −1.39581e−04 |
| surface R5 | C02 = −1.84925e−02 | C20 = −8.18249e−03 | |
| | C03 = −1.08792e−04 | C21 = 1.60755e−03 | |
| | C04 = −1.79570e−04 | C22 = −1.21026e−03 | C40 = −4.14091e−04 |
| surface R6 | C02 = −2.65562e−02 | C20 = −2.11329e−02 | |
| | C03 = 7.38808e−05 | C21 = 2.82041e−04 | |
| | C04 = −3.46320e−05 | C22 = −2.49266e−04 | C40 = 2.48610e−05 |
| surface R9 | C02 = 2.43116e−02 | C20 = 3.12150e−02 | |
| | C03 = 8.60449e−04 | C21 = −1.74279e−03 | |
| | C04 = 6.03223e−05 | C22 = −1.46771e−04 | C40 = 7.87587e−05 |
| surface R10 | C02 = −2.50756e−02 | C20 = 8.47992e−04 | |
| | C03 = 9.16289e−06 | C21 = −6.12416e−03 | |
| | C04 = −6.54263e−05 | C22 = −1.77537e−04 | C40 = 2.46426e−04 |
| surface R11 | C02 = 4.04553e−02 | C20 = 4.59632e−02 | |
| | C03 = −1.85442e−03 | C21 = 2.67661e−03 | |
| | C04 = 4.88193e−04 | C22 = 1.23645e−03 | C40 = −6.35068e−05 |
| surface R12 | C02 = −2.90408e−02 | C20 = −8.00000e−02 | |
| | C03 = −6.81882e−05 | C21 = 1.16013e−02 | |
| | C04 = 3.36006e−04 | C22 = −2.43191e−03 | C40 = 8.31150e−04 |

-continued

| | | | |
|---|---|---|---|
| surface R16 | C02 = 1.87672e−02 | C20 = 5.27232e−02 | |
| | C03 = 1.12373e−04 | C21 = −1.64190e−03 | |
| | C04 = 1.89013e−05 | C22 = 5.46061e−05 | C40 = 2.11500e−04 |
| surface R17 | C02 = 5.63146e−03 | C20 = −4.66337e−02 | |
| | C03 = 9.10393e−04 | C21 = −1.82539e−03 | |
| | C04 = 3.21114e−05 | C22 = −7.82380e−04 | C40 = 4.32072e−04 |
| surface R18 | C02 = 2.34915e−02 | C20 = 2.96401e−02 | |
| | C03 = −2.98888e−04 | C21 = 1.64372e−03 | |
| | C04 = 1.33834e−04 | C22 = 1.42034e−04 | C40 = 7.77143e−06 |
| surface R19 | C02 = −2.63915e−03 | C20 = −5.37233e−03 | |
| | C03 = −1.99724e−03 | C21 = 3.35104e−03 | |
| | C04 = 2.06405e−04 | C22 = 1.27901e−04 | C40 = 6.50230e−05 |
| surface R20 | C02 = 2.84444e−02 | C20 = 8.06324e−03 | |
| | C03 = −4.36035e−04 | C21 = −9.98362e−04 | |
| | C04 = 8.30716e−06 | C22 = 1.99710e−04 | C40 = 1.40741e−04 |

In FIG. 1, the first surface R1 to the seventh surface R7 together constitute a first optical element B1, the eighth surface R8 to the thirteenth surface R13 together constitute a second optical element B2, and the fifteenth surface R15 to the twenty-first surface R21 together constitute a third optical element B3. Each of the optical elements B1–B3 comprises an optical block which is an integral transparent body, and the optical element B1 corresponds to the first optical portion of the present invention.

The fourteenth surface R14 is a stop and disposed more adjacent to the image side than the optical element B1 and between the optical element B2 and the optical element B3. B4 designates an optical correcting plate comprising a plane parallel plate, and it is comprised of a low-pass filter, an infrared cut filter or the like formed of rock crystal.

The letter P denotes an image pickup element surface which is the last image surface, and it is, for example, the image pickup surface of a CCD (image pickup medium) or the like.

Description will hereinafter be made of the imaging action when the object position is at infinity. First, the light beam from the object enters the refracting surface R1 of the first optical element B1. In the first optical element B1, the light beam is refracted by the first surface R1, is reflected by the second surface R2, the third surface R3, the fourth surface R4, the firth surface R5 and the sixth surface R6, is refracted by the seventh surface R7 and emerges from the first optical element B1. In the present embodiment, the light beam forms an entrance pupil between the first surface R1 and the second surface R2. Further, the light beam forms a pupil near the seventh surface R7. Also, the light beam is intermediately imaged between the third surface R3 and the fourth surface R4.

Next, the light beam enters the refracting surface R8 of the second optical element B2. In the second optical element B2, the light beam is refracted by the eighth surface R8, is reflected by the ninth surface R9, the tenth surface R10, the eleventh surface R11 and the twelfth surface R12, is refracted by the thirteenth surface R13 and emerges from the second optical element B2. The light beam has an intermediate imaging plane near the ninth surface R9 and near the twelfth surface R12. Also, the light beam forms a pupil near the tenth surface R10.

Next, the light beam which has emerged from the second optical element B passes through the fourteenth surface R14 which is a stop, and enters the refracting surface R15 of the third optical element B3. In the third optical element B3, the light beam is refracted by the fifteenth surface R15, is reflected by the sixteenth surface R16, the seventeenth surface R17, the eighteenth surface R18, the nineteenth surface R19 and the twentieth surface R20, is refracted by the twenty-first surface R21 and emerges from the third optical element B3. The light beam forms a pupil near the nineteenth surface R19. Further, the light beam is intermediately imaged near the eighteenth surface R18.

Lastly, the light beam which has emerged from the third optical element B3 passes through the optical correcting plate B4 and is imaged on the last imaging plane P.

Description will now be made of the movement of each optical element resulting from the focal length changing operation. During focal length change, the first optical element B1 is fixed and is not moved. The second optical element B2 is moved in Z minus direction to thereby effect focal length change from the wide angle end to the telephoto end, and the fluctuation of the image surface resulting from the focal length change is corrected by the third optical element B3 being moved and also, focusing is effected. The image surface P does not move during the focal length change. The first optical element B1 corresponds to the fore lens of a so-called photographing optical system, the second optical element B2 corresponds to a so-called variator, and the third optical element B3 corresponds to a compensator.

Figure 2:
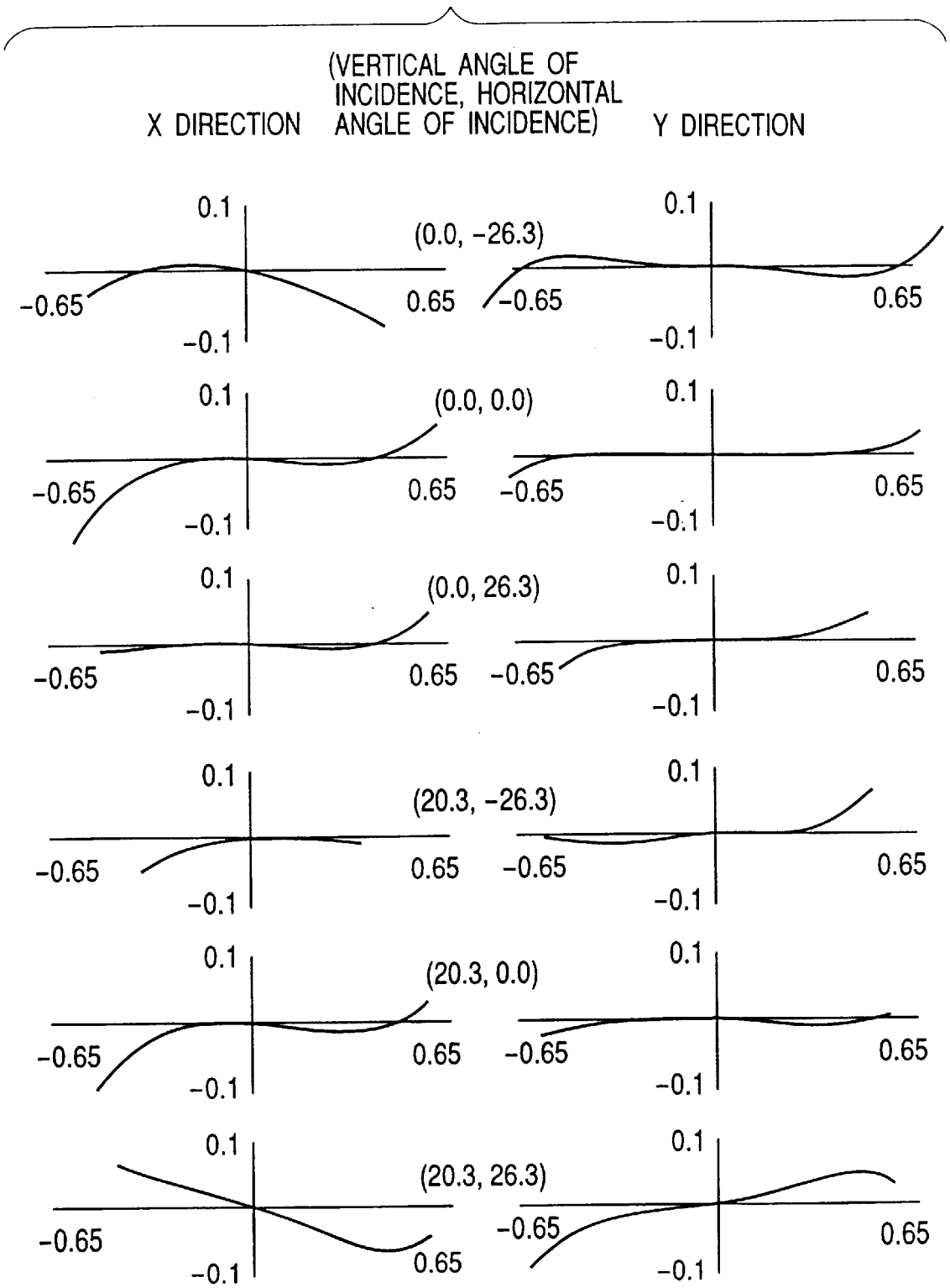
FIG. 2 is the lateral aberration graph (wide angle end) of Embodiment 1.
Figure 3:
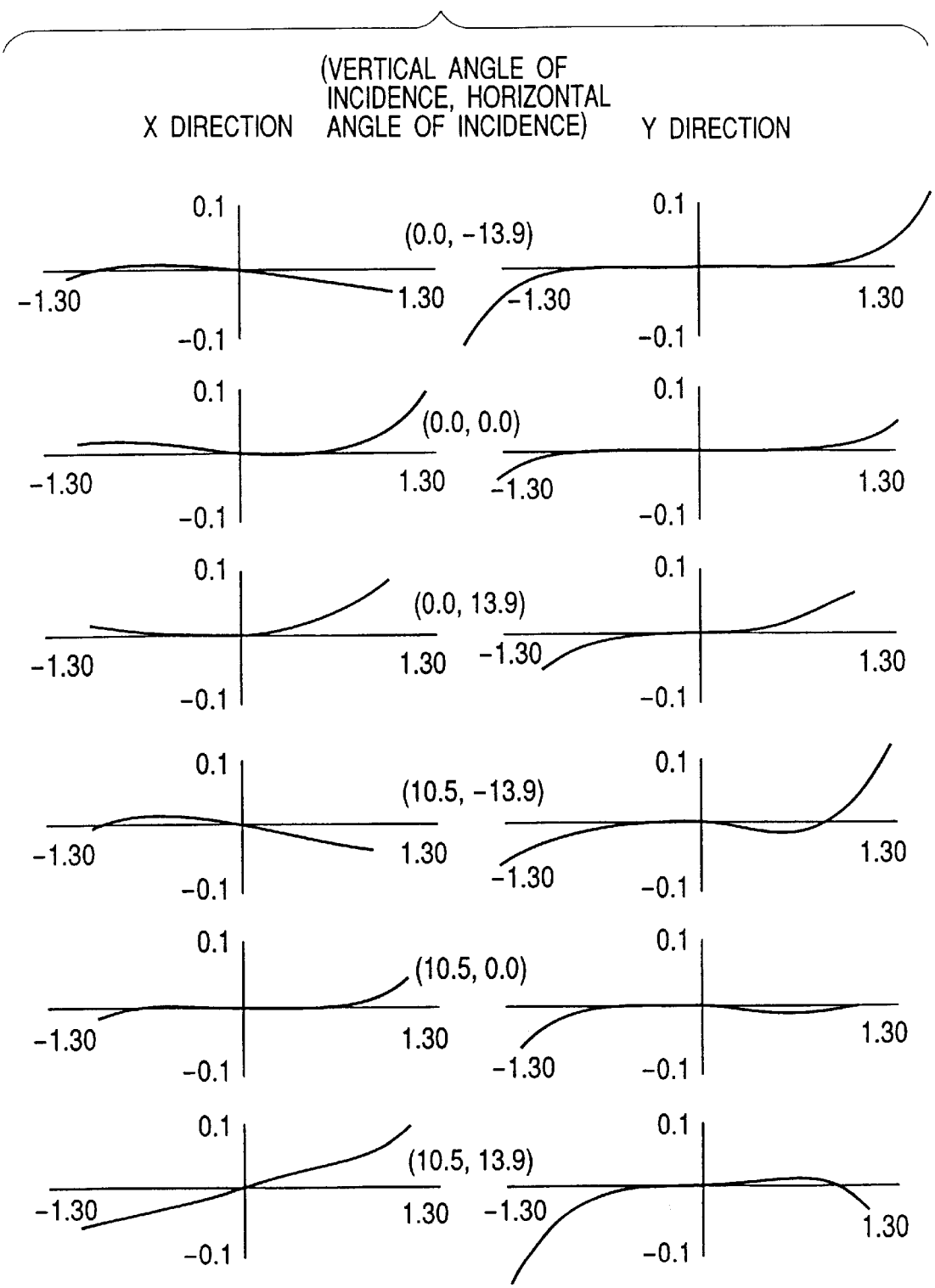
FIG. 3 is the lateral aberration graph (intermediate position) of Embodiment 1.
Figure 4:
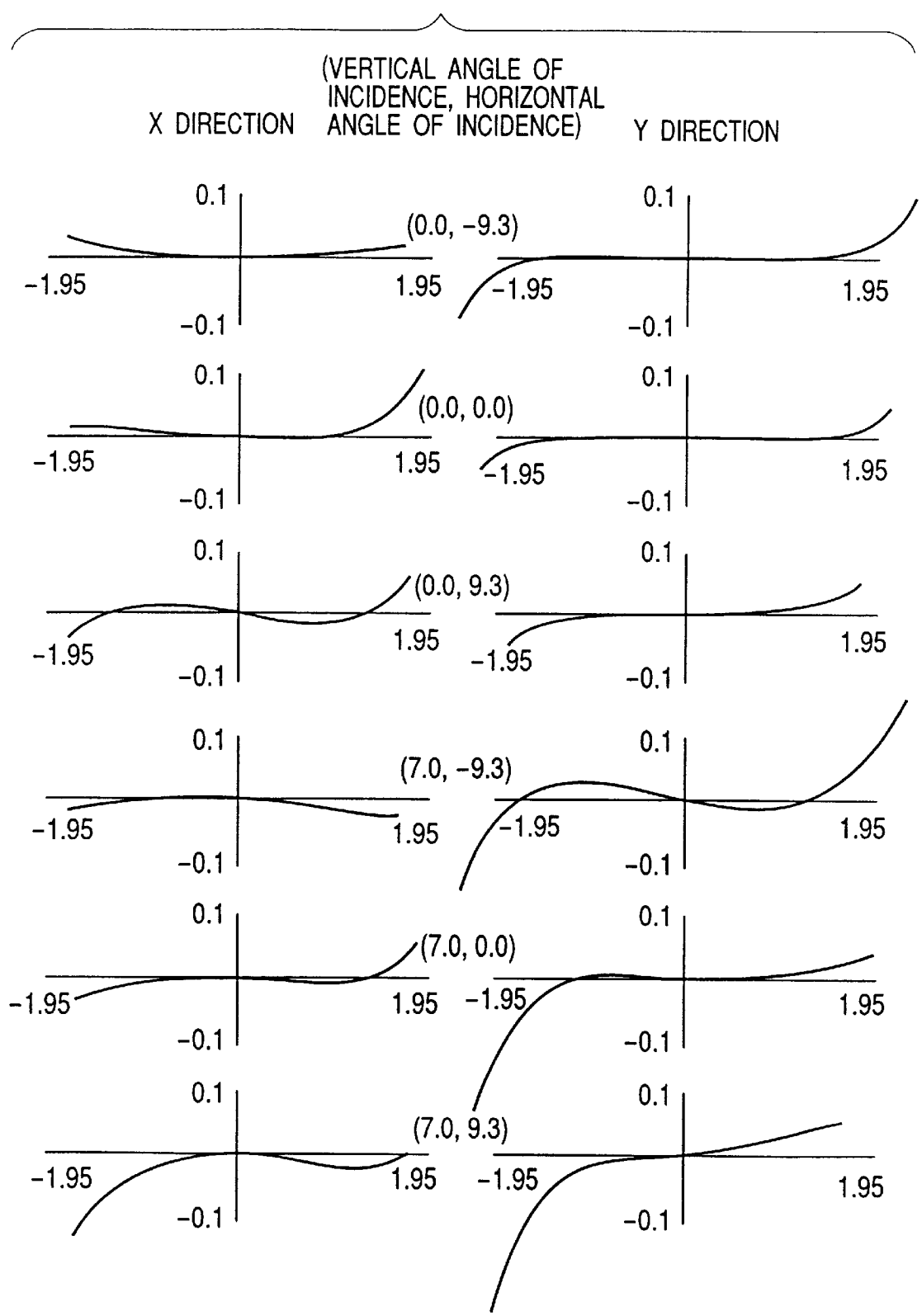
FIG. 4 is the lateral aberration graph (telephoto end) of Embodiment 1.

FIGS. 2, 3 and 4 are the lateral aberration graphs of the present embodiment.

The effect of the present embodiment will now be described.

The stop R14 is provided on the image side of the first optical element B1 and between the second optical element B2 and the third optical element B3, whereby even if the diameter of the stop is fixed and the focal length is changed to 3.64–10.92 mm, the F number is nearly 2.8 and constant.

Figure 13:
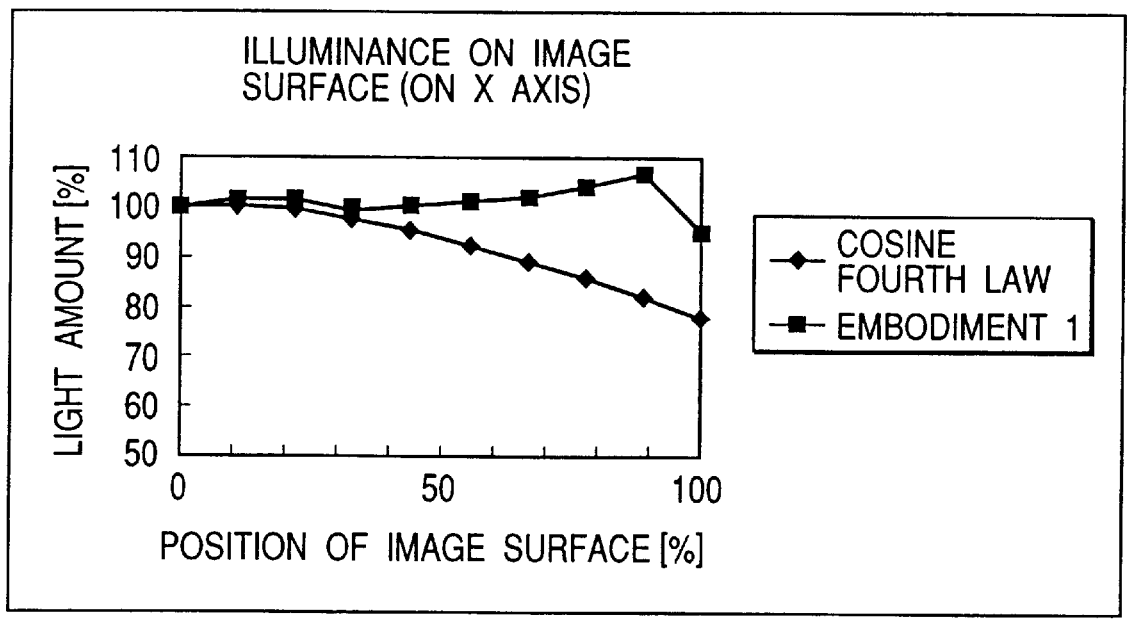
FIG. 13 represents the illuminance on an image surface on the x-axis at the wide angle end of Embodiment 1 of the present invention.

FIG. 13 represents the illuminance on the image surface on the x-axis of the local coordinates on the image surface at the wide angle end of the present embodiment, and the axis of ordinates thereof represents the illuminance on the image surface when the light amount at the center is 100, and the axis of abscissas represents the position of the image surface when a half of the image size in x direction is 100.

When the stop is located most adjacent to the object side of the optical system, there is not pupil aberration and therefore, the marginal light amount is reduced in accordance with the cosine fourth law. In the present embodiment, as shown in FIG. 13, the marginal light amount is improved by nearly 20% as compared with the cosine fourth law.

Also, at the wide angle end, the imaging magnification of the entrance pupil at the stop position is 1.4 times. When the stop is located most adjacent to the object side of the optical system, the size of the entrance pupil is intactly the diameter of the stop, but in the present embodiment, it is a size 1.4 times as large as the diameter of the stop.

That is, the diameter of the small stop is prevented from becoming extremely small.

Also, by adopting a construction in which the image of the stop R14 is formed on the object side by the optical elements B2 and B1 which effect imaging at a negative magnification by the optical system (optical elements B2, B1) forward of the stop position, the effective diameter of the ray on each surface is suppressed to a small value and the compactness of each optical element and the entire photographing optical system is achieved.

In the present embodiment, the spacing D from the first surface to the third surface is $$D=D1+D2=2.18,$$

and the average spacing $$|(X(0)+X(90))/2|$$

from the first surface to the entrance pupil is, at the wide angle end, $$|(X(0)+X(90))/2|=|(2.91+0.90)/2|=1.90<D,$$

and at the intermediate position, $$|(X(0)+X(90))/2|=|(3.67+0.32)/2|=2.00<D,$$

and at the telephoto end, $$|(X(0)+X(90))/2|=|(1.99+1.50)/2|=1.75<D.$$

Thus, the optical system of Embodiment 1 satisfies conditional expression (1) in the entire zoom area and the entrance pupil is located near the optical surface most adjacent to the object side and therefore, a reduction in the effective diameter of the optical system is achieved.

In the present embodiment, the stop R14 is placed between the second optical element B2 and the third optical element B3, but if the paraxial disposition is changed, it is also possible to provide the stop between the first optical element B1 and the second optical element B2.

Figure 5:
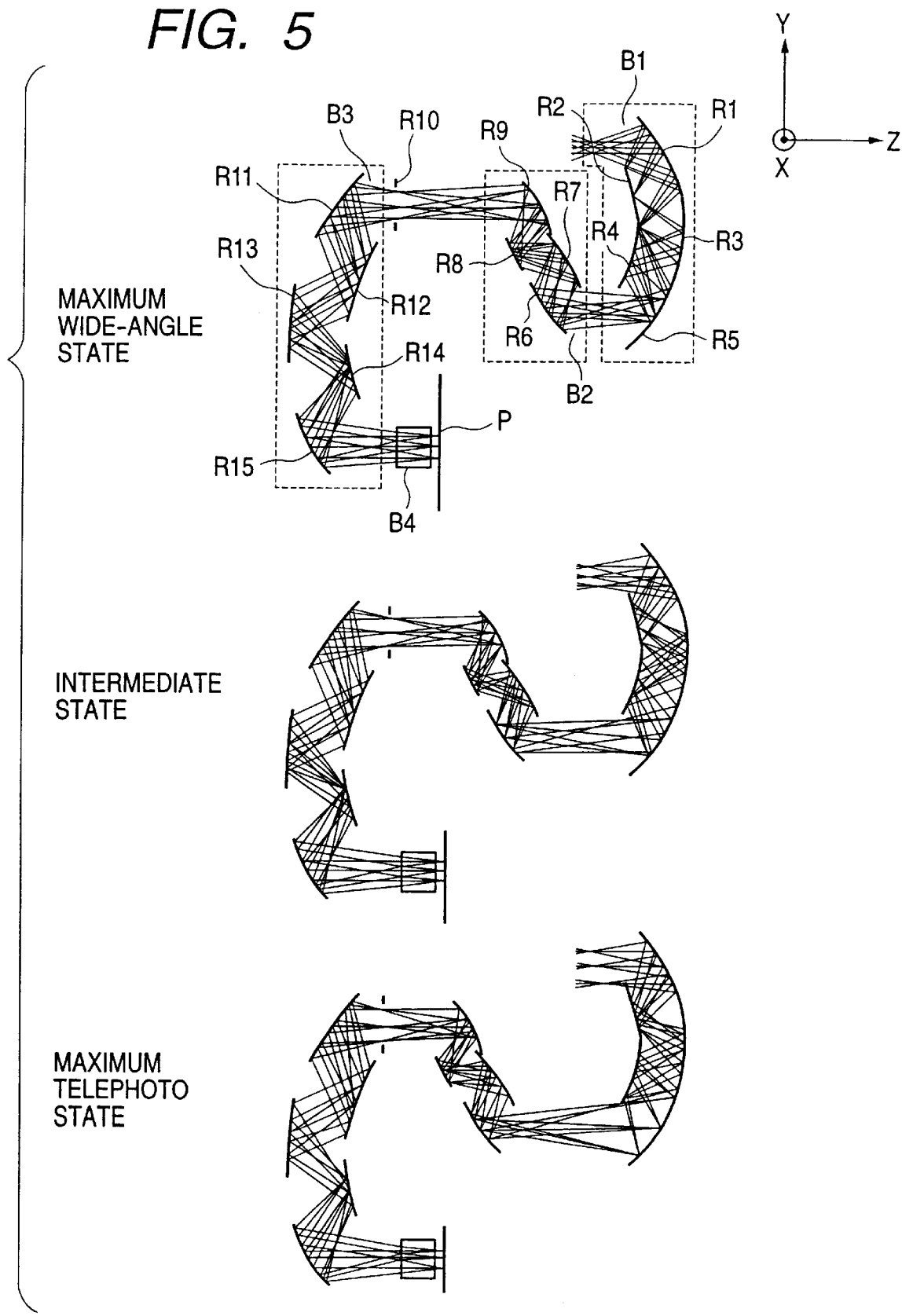
FIG. 5 is an optical cross-sectional view of Embodiment 2 of the present invention in YZ plane.

FIG. 5 is an optical cross-sectional view of Embodiment 2 of the present invention in the YZ plane. This embodiment is the image pickup optical system of a three-unit zoom lens having a variable power ratio of about three times using three hollow type optical elements each comprising a plurality of surface reflecting mirrors. The construction data thereof are shown below.

|  | wide angle end | intermediate | telephoto end |
|---|---|---|---|
| horizontal half angle of view | 19.1 | 9.8 | 6.6 |
| vertical half angle of view | 14.5 | 7.4 | 4.9 |
| stop diameter | 2.6 | 2.6 | 2.6 |

| i | $Y_i$ | $Z_i(W)$ | $\theta_i$ | $D_i$ | $N_{di}$ | $\nu_{di}$ |  |
|---|---|---|---|---|---|---|---|
| first optical element: B1 | | | | | | | |
| 1 | 0.00 | 15.31 | 31.30 | 9.92 | 1 | | reflecting surface |
| 2 | −8.81 | 10.75 | 14.98 | 9.92 | 1 | | reflecting surface |
| 3 | −14.15 | 19.10 | −1.81 | 10.00 | 1 | | reflecting surface |
| 4 | −19.01 | 10.36 | −16.67 | 9.96 | 1 | | reflecting surface |
| 5 | −27.83 | 14.98 | −31.18 | −31.18 | 1 | | reflecting surface |
| second optical element: B2 | | | | | | | |
| 6 | −27.83 | −3.81 | 36.09 | 9.56 | 1 | | reflecting surface |
| 7 | −18.73 | −0.88 | 34.40 | 9.18 | 1 | | reflecting surface |
| 8 | −18.18 | −10.05 | 27.88 | 9.37 | 1 | | reflecting surface |
| 9 | −10.14 | −5.24 | 29.56 | variable | 1 | | reflecting surface |
| stop | | | | | | | |
| 10 | −10.14 | −30.37 | 0.00 | variable | 1 | | stop |
| third optical element: B3 | | | | | | | |
| 11 | −10.14 | −40.40 | −35.72 | 13.71 | 1 | | reflecting surface |
| 12 | −23.15 | −36.04 | −21.17 | 14.29 | 1 | | reflecting surface |
| 13 | −30.10 | −48.52 | −3.60 | 13.57 | 1 | | reflecting surface |
| 14 | −38.13 | −37.58 | 11.86 | 14.29 | 1 | | refracting surface |
| 15 | −50.51 | −44.72 | 29.80 | variable | 1 | | refracting surface |
| optical correcting plate | | | | | | | |
| 16 | −50.65 | −29.35 | −0.06 | 5.71 | 1.51633 | 64.15 | reflecting surface |
| 17 | −50.66 | −23.64 | −0.06 | 1.43 | 1 | | reflecting surface |
| image surface | | | | | | | |
| P | −50.66 | −22.21 | −0.06 | | 1 | | image surface |

|  | wide angle end | intermediate | telephoto end |
|---|---|---|---|
| D5 | 18.79 | 27.11 | 31.34 |
| D9 | 25.13 | 18.66 | 14.09 |
| D10 | 10.03 | 9.73 | 9.79 |
| D15 | 15.37 | 16.91 | 16.63 |

-continued

| | | |
|---|---|---|
| D1 to 5 surfaces | Zi(M) = Zi(W) − 0.00 | Zi(T) = Zi(W) − 0.00 |
| D6 to 9 surfaces | Zi(N) = Zi(W) − 8.32 | Zi(T) = Zi(W) − 12.55 |
| D10 surface | Zi(M) = Zi(W) − 1.85 | Zi(T) = Zi(W) − 1.51 |
| D11 to 15 surfaces | Zi(M) = Zi(W) − 1.55 | Zi(T) = Zi(W) − 1.26 |
| P | Zi(M) = Zi(W) | Zi(T) = Zi(W) | aspherical surface shape

| | | | |
|---|---|---|---|
| surface R1 | C02 = −1.80239e−02 | C20 = −2.81931e−02 | |
| | C03 = 2.44018e−04 | C21 = −5.43047e−04 | |
| | C04 = −2.32825e−05 | C22 = 1.72384e−05 | C40 = −5.19185e−04 |
| surface R2 | C02 = −6.90964e−03 | C20 = 1.41392e−02 | |
| | C03 = 1.24650e−04 | C21 = 4.47556e−04 | |
| | C04 = −2.20542e−06 | C22 = 1.29393e−04 | C40 = −1.71792e−03 |
| surface R3 | C02 = −1.69001e−02 | C20 = −3.56762e−02 | |
| | C03 = 4.96628e−05 | C21 = −1.58142e−04 | |
| | C04 = −3.11289e−05 | C22 = −5.12061e−05 | C40 = −9.06178e−05 |
| surface R4 | C02 = −1.15275e−02 | C20 = −9.34471e−03 | |
| | C03 = 4.30564e−05 | C21 = 5.48380e−03 | |
| | C04 = −1.00934e−04 | C22 = −7.58584e−04 | C40 = −1.25938e−03 |
| surface R5 | C02 = −1.85162e−02 | C20 = −2.48531e−02 | |
| | C03 = 2.16240e−06 | C21 = −2.04418e−04 | |
| | C04 = −9.49313e−06 | C22 = −2.33936e−04 | C40 = 1.51644e−04 |
| surface R6 | C02 = 1.43123e−02 | C20 = 2.40374e−02 | |
| | C03 = 2.10298e−04 | C21 = −1.07025e−04 | |
| | C04 = −7.74728e−06 | C22 = −1.02603e−04 | C40 = 1.89928e−05 |
| surface R7 | C02 = −1.80425e−02 | C20 = 3.64565e−03 | |
| | C03 = −5.39315e−04 | C21 = −4.19921e−03 | |
| | C04 = −1.09354e−04 | C22 = −3.01183e−04 | C40 = −2.25275e−05 |
| surface R8 | C02 = 2.65184e−02 | C20 = 3.97496e−02 | |
| | C03 = −9.25073e−04 | C21 = 6.08064e−03 | |
| | C04 = 1.09805e−04 | C22 = −6.84333e−04 | C40 = 3.85561e−04 |
| surface R9 | C02 = −3.13851e−02 | C20 = −5.47985e−02 | |
| | C03 = −1.52201e−04 | C21 = 1.08265e−03 | |
| | C04 = 2.70011e−05 | C22 = 6.86770e−05 | C40 = 8.44829e−06 |
| surface R11 | C02 = 1.20984e−02 | C20 = 3.64645e−02 | |
| | C03 = 2.05797e−04 | C21 = −7.92122e−04 | |
| | C04 = 1.71277e−05 | C22 = −1.30672e−05 | C40 = 8.34067e−05 |
| surface R12 | C02 = 8.10806e−04 | C20 = −6.65451e−04 | |
| | C03 = 5.37128e−04 | C21 = 1.47219e−03 | |
| | C04 = 2.58691e−05 | C22 = −2.75183e−04 | C40 = 1.37222e−03 |
| surface R13 | C02 = 1.59911e−02 | C20 = 2.02903e−02 | |
| | C03 = 9.28696e−05 | C21 = 2.03698e−04 | |
| | C04 = −1.28942e−05 | C22 = 6.16247e−05 | C40 = 2.87746e−05 |
| surface R14 | C02 = −4.38370e−04 | C20 = −4.68589e−03 | |
| | C03 = −1.35981e−03 | C21 = 3.19165e−05 | |
| | C04 = 3.86177e−05 | C22 = 8.22955e−05 | C40 = 7.85514e−05 |
| surface R15 | C02 = 2.02500e−02 | C20 = 4.71448e−03 | |
| | C03 = −8.87725e−05 | C21 = −1.34980e−03 | |
| | C04 = 2.53668e−06 | C22 = 2.59431e−05 | C40 = 4.34894e−05 |

In FIG. 5, the first surface R1 to the fifth surface R5 together constitute the first optical element B1, the sixth surface R6 to the ninth surface R9 together constitute the second optical element B2, and the eleventh surface R11 to the fifteenth surface R15 together constitute the third optical element B3. Each of the optical elements B1–B3 is integrally constituted by a housing, and the optical element B1 corresponds to the first optical portion of the present invention.

The tenth surface R10 is a stop and is disposed more adjacent to the image side than the optical element B1 and between the optical element B2 and the optical element B3. B4 designates an optical correcting plate comprising a plane parallel plate, and it is comprised of a low-pass filter, an infrared cut filter or the like formed of rock crystal.

P denotes an image pickup element surface which is the last image surface, and it is, for example, the image pickup surface of a CCD (image pickup medium) or the like.

Description will hereinafter be made of the imaging action when the object position is at infinity. The light beam from the object first enters the reflecting surface R1 of the first optical element B1. In the first optical element B1, the light beam is reflected by the first surface R1, the second surface R2, the third surface R3, the fourth surface R4 and the fifth surface R5, and emerges from the first optical element B1. The light beam forms an entrance pupil in front of the first surface R1. Further, it forms a pupil near the fifth surface R5. Also, it is intermediately imaged between the second surface R2 and the third surface R3.

Next, the light beam enters the reflecting surface R6 of the second optical element B2. In the second optical element B2, the light beam is reflected by the sixth surface R6, the seventh surface R7, the eighth surface R8 and the ninth surface R9, and emerges from the second optical element B2. The light beam has an intermediate imaging plane near the sixth surface R6 and near the ninth surface R9. Also, it forms a pupil near the eighth surface R8.

Next, the light beam which has emerged from the second optical element B2 passes through the tenth surface R10 which is the stop, and enters the reflecting surface R11 of the third optical element B3. In the third optical element B3, the light beam is reflected by the eleventh surface R11, the twelfth surface R12, the thirteenth surface R13, the fourteenth surface R14 and the fifteenth surface R15, and emerges from the third optical element B3. The light beam forms a pupil near the fourteenth surface R14. Further, it is intermediately imaged near the thirteenth surface R13.

Lastly, the light beam which has emerged from the third optical element B3 passes through the optical correcting plate B4 and is imaged on the last imaging plane P.

Description will now be made of the movement of each optical element resulting from the focal length changing operation. During the focal length change, the first optical element B1 is stationary. The second optical element B2 is moved in Z minus direction to thereby effect focal length change from the wide angle end to the telephoto end, and the fluctuation of the image surface resulting from the focal length change is corrected by the third optical element B3 being moved and also, focusing is effected. The image surface P does not move during the focal length change. The first optical element B1 corresponds to the fore lens of a so-called photographing optical system, the second optical element B2 corresponds to a so-called variator, and the third optical element B3 corresponds to a compensator.

Figure 6:
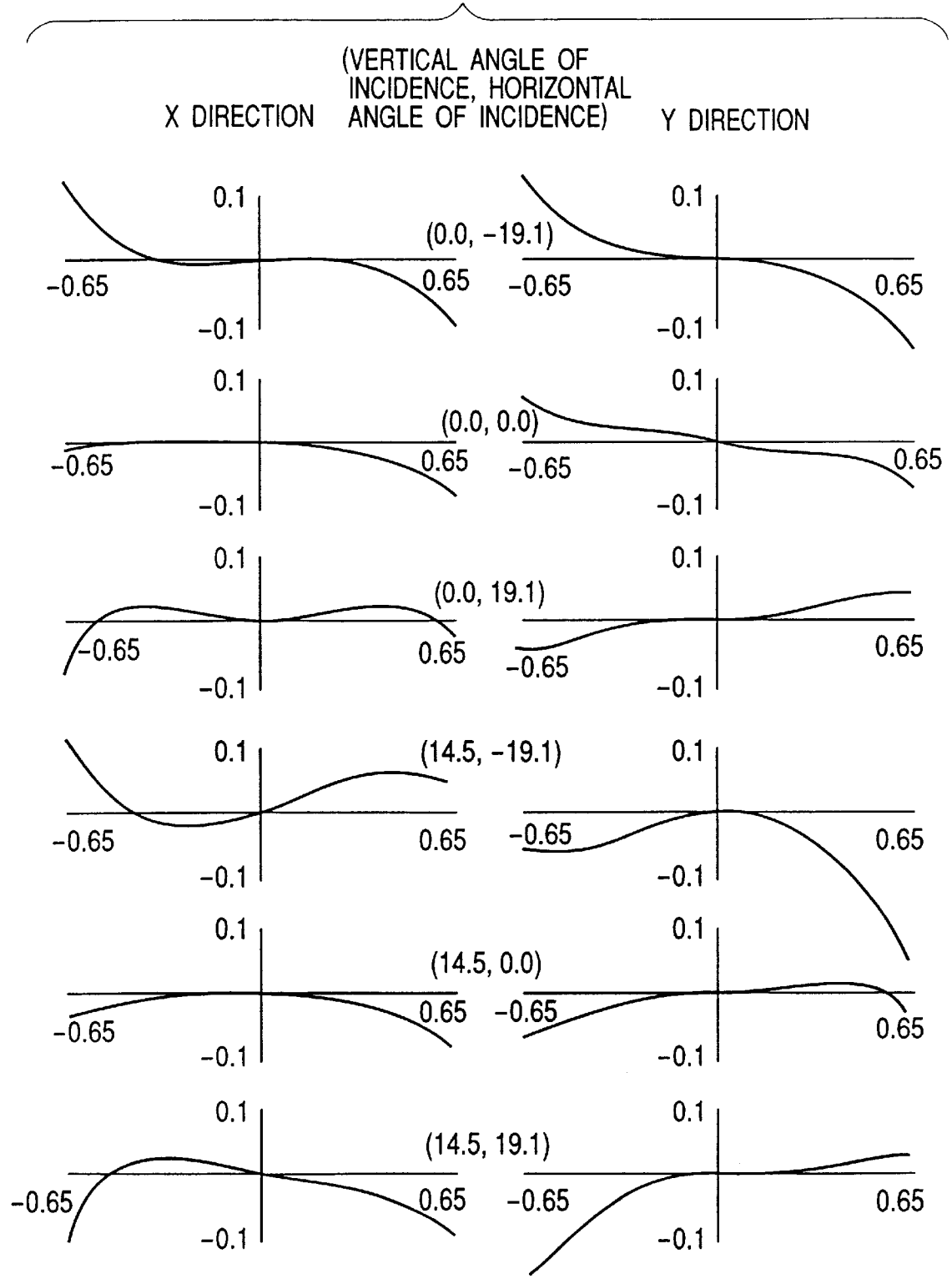
FIG. 6 is the lateral aberration graph (wide angle end) of Embodiment 2.
Figure 7:
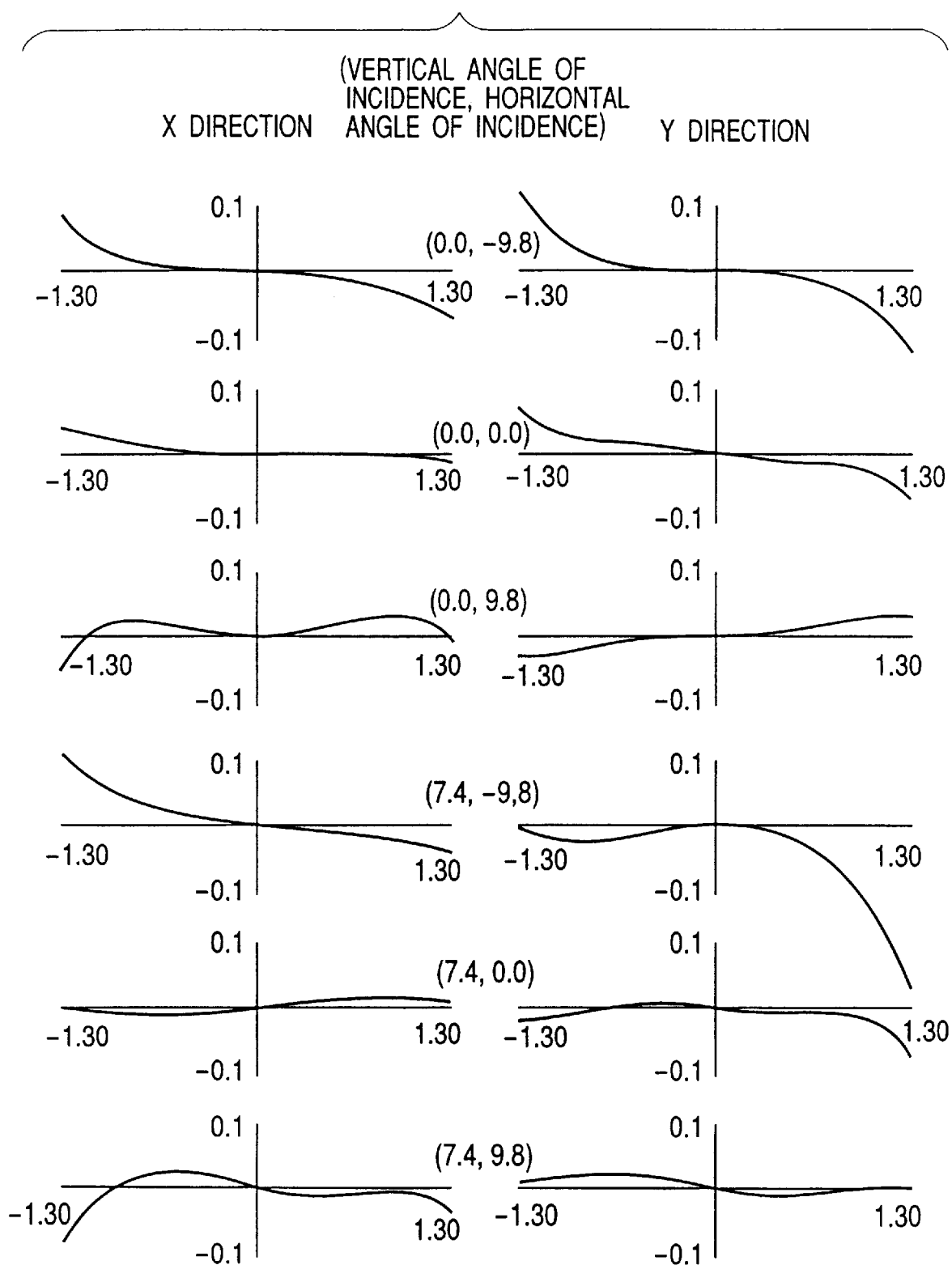
FIG. 7 is the lateral aberration graph (intermediate position) of Embodiment 2.
Figure 8:
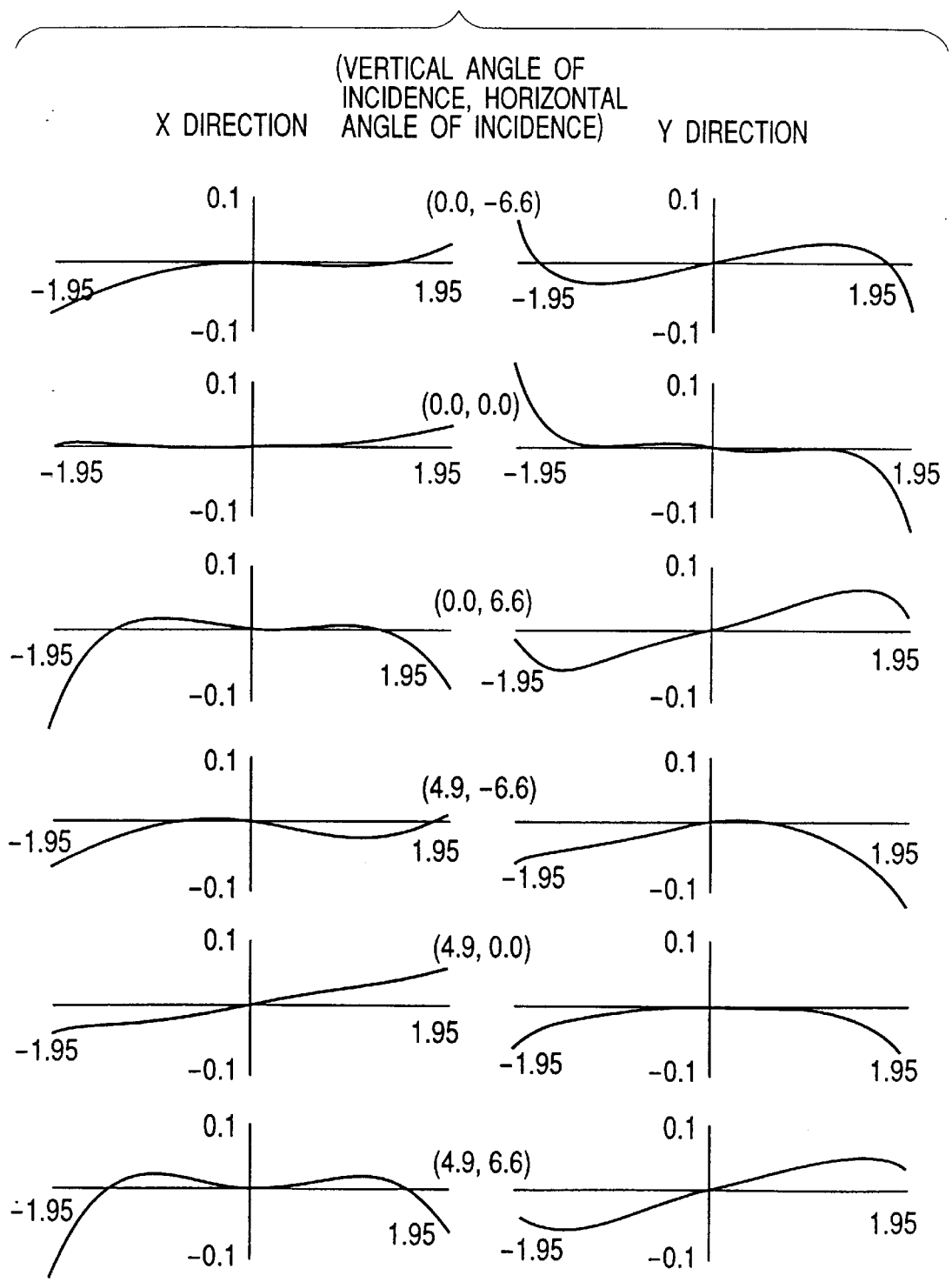
FIG. 8 is the lateral aberration graph (telephoto end) of Embodiment 2.

FIGS. 6, 7 and 8 are the lateral aberration graphs of the present embodiment.

The effect of the present embodiment will now be described.

The stop R10 is provided on the image side of the first optical element B1 and between the second optical element B2 and the third optical element B3, whereby the F number is 4 and constant even if the diameter of the stop is fixed and the focal length is changed to 5.2–15.6 mm.

Figure 14:
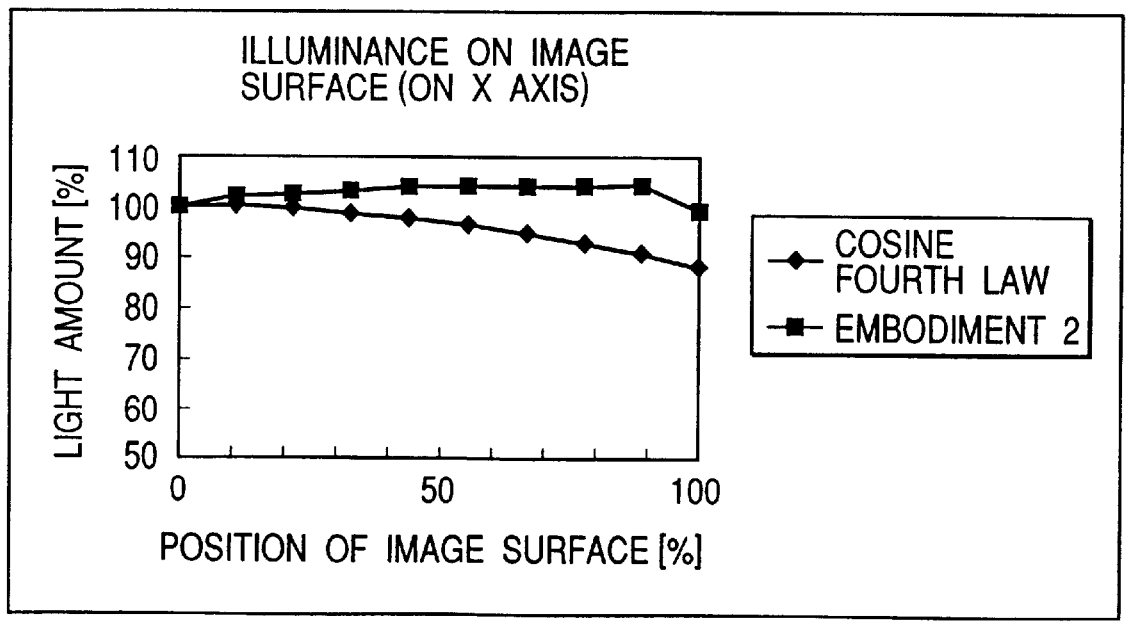
FIG. 14 represents the illuminance on an image surface on the x-axis at the wide angle end of Embodiment 2 of the present invention.

Also, FIG. 14 represents the illuminance on the image surface on the x-axis of the local coordinates on the image surface at the wide angle end of the present embodiment. The axis of ordinates of FIG. 14 represents the illuminance on the image surface when the central light amount is 100, and the axis of abscissas thereof represents the image surface position when a half of the image size in x direction is 100. When the stop is in front of the optical system, there is no pupil aberration and therefore, the marginal light amount is reduced in accordance with the cosine fourth law. As shown in FIG. 14, in the present embodiment, the marginal light amount is improved by nearly 12% as compared with the cosine fourth law. Also, at the wide angle end, the imaging magnification of the entrance pupil at the stop position is about 2 times. When the stop is most adjacent to the object side of the optical system, the size of the entrance pupil becomes intactly the diameter of the stop, but in the present embodiment, it is twice as large as that. That is, the diameter of the small stop is prevented from becoming extremely small.

Also, by adopting a construction in which the image of the stop R10 is formed at a negative magnification by the optical system forward of the stop position (the second optical element B2 and the first optical element B1), the effective diameter of the ray on each surface is suppressed to a small value and the compactness of each optical element and the entire photographing optical system is achieved.

In the present embodiment, the spacing D from the first surface to the third surface is $$D = D1 + D2 = 19.84$$

and the average spacing $|(X(0)+X(90))/2|$ from the first surface to the entrance pupil is, at the wide angle end, $$|(X(0)+X(90))/2| = |(-14.93-2.59)/2| = 8.76 < D,$$

and at the intermediate position, $$|(X(0)+X(90))/2| = |(-13.49-4.85)/2| = 9.17 < D,$$

and at the telephoto end, $$|(X(0)+X(90))/2| = |(-15.39-4.39)/2| = 9.89 < D.$$

Thus, the optical system of Embodiment 2 satisfies conditional expression (1) in the entire zoom area, and the entrance pupil is located near the optical surface most adjacent to the object side. Therefore, a reduction in the effective diameter of the optical system is achieved.

In the present embodiment, the stop is placed between the second optical element B2 and the third optical element B3, but if the paraxial disposition is changed, it will also be possible to provide the stop between the first optical element B1 and the second optical element B2.

Figure 9:
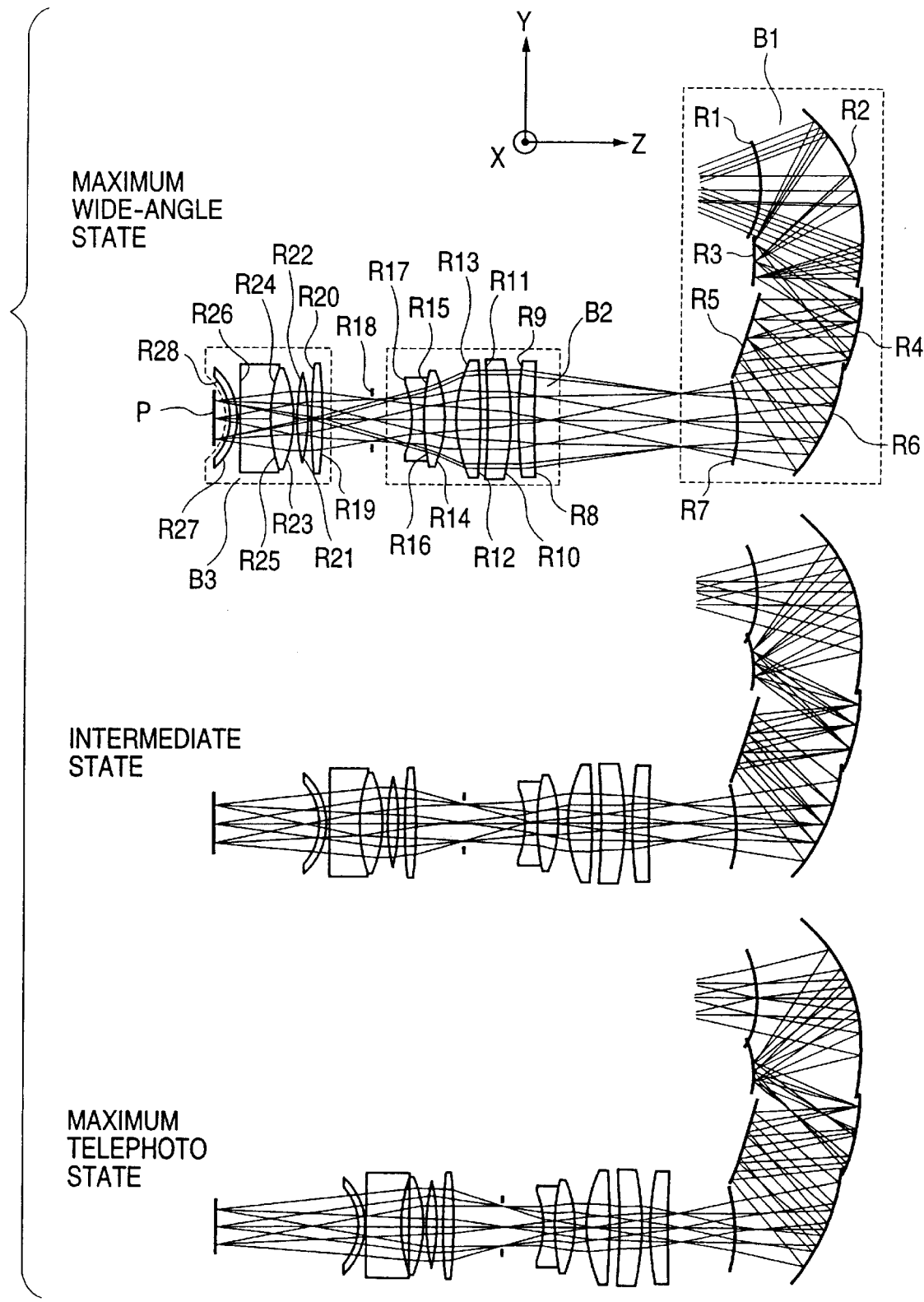
FIG. 9 is an optical cross-sectional view of Embodiment 3 of the present invention in YZ plane.

FIG. 9 is an optical cross-sectional view of Embodiment 3 of the present invention in the YZ plane. This embodiment is the image pickup optical system of a three-unit zoom lens having a variable power ratio of about 2 times comprising a solid type optical element B1 and two coaxial refraction type optical elements B2 and B3. The construction data thereof are shown below.

|  | wide angle end | intermediate | telephoto end |
| --- | --- | --- | --- |
| horizontal half angle of view | 20.8 | 14.2 | 10.8 |
| vertical half angle of view | 15.9 | 10.8 | 8.1 |
| stop diameter | 1.89 | 1.75 | 2.01 | image size horizontal × vertical 3.554 mm × 2.666 mm
first optical element: B1

| i | Yi | Zi (W) | θi | Di | Ndi | νdi | |
| --- | --- | --- | --- | --- | --- | --- | --- |
| 1 | 0.00 | 0.00 | 0.00 | 9.00 | 1.64769 | 33.80 | refracting surface |
| 2 | 0.00 | 9.00 | 17.78 | 11.66 | 1.64769 | 33.80 | reflecting surface |
| 3 | −6.78 | −0.48 | 2.45 | 11.20 | 1.64769 | 33.80 | reflecting surface |
| 4 | −12.49 | 9.15 | −10.81 | 10.61 | 1.64769 | 33.80 | reflecting surface |
| 5 | −14.15 | −1.32 | −17.97 | 10.69 | 1.64769 | 33.80 | reflecting surface |
| 6 | −21.71 | 6.24 | −22.49 | 8.37 | 1.64769 | 33.80 | reflecting surface |
| 7 | −21.71 | −2.13 | 0.00 | variabe | 1 | | reflecting surface |

-continued second optical element: B2

| | | | | | | | |
|---|---|---|---|---|---|---|---|
| 8 | −21.71 | −21.15 | 0.00 | 1.82 | 1.48749 | 70.21 | refracting surface |
| 9 | −21.71 | −22.98 | 0.00 | 0.57 | 1 | | refracting surface |
| 10 | −21.71 | −23.55 | 0.00 | 2.16 | 1.60311 | 60.66 | refracting surface |
| 11 | −21.71 | −25.71 | 0.00 | 0.70 | 1 | | refracting surface |
| 12 | −21.71 | −26.41 | 0.00 | 2.55 | 1.62041 | 60.27 | refracting surface |
| 13 | −21.71 | −28.96 | 0.00 | 0.78 | 1 | | refracting surface |
| 14 | −21.71 | −29.74 | 0.00 | 2.21 | 1.64100 | 56.92 | refracting surface |
| 15 | −21.71 | −31.95 | 0.00 | 0.13 | 1 | | refracting surface |
| 16 | −21.71 | −32.08 | 0.00 | 0.83 | 1.71736 | 29.51 | refracting surface |
| 17 | −21.71 | −32.91 | 0.00 | variable | 1 | | refracting surface | stop

| 18 | −21.71 | −36.81 | 0.00 | 4.55 | 1 | | stop | third optical element: B3

| 19 | −21.71 | −41.36 | 0.00 | 1.02 | 1.58913 | 61.18 | refracting surface |
| 20 | −21.71 | −42.38 | 0.00 | 0.62 | 1 | | refracting surface |
| 21 | −21.71 | −43.00 | 0.00 | 0.93 | 1.56384 | 60.69 | refracting surface |
| 22 | −21.71 | −43.93 | 0.00 | 0.21 | 1 | | refracting surface |
| 23 | −21.71 | −44.14 | 0.00 | 2.28 | 1.60311 | 60.66 | refracting surface |
| 24 | −21.71 | −46.42 | 0.00 | 0.11 | 1 | | refracting surface |
| 25 | −21.71 | −46.53 | 0.00 | 3.02 | 1.75520 | 27.51 | refracting surface |
| 26 | −21.71 | −49.55 | 0.00 | 0.27 | 1 | | refracting surface |
| 27 | −21.71 | −49.82 | 0.00 | 0.53 | 1.65446 | 33.62 | refracting surface |
| 28 | −21.71 | −50.35 | 0.00 | variable | 1 | | refracting surface | image surface

| P | −21.71 | −51.75 | 0.00 | | 1 | | image surface |

| | wide angle end | intermediate | telephoto end |
|---|---|---|---|
| D7 | 19.02 | 8.04 | 6.49 |
| D17 | 3.90 | 6.12 | 4.10 |
| D28 | 1.40 | 10.16 | 13.73 |

D1 to 7 surfaces   $Zi(M) = Zi(W) − 0.00$   $Zi(T) = Zi(W) + 0.00$
D8 to 17 surfaces  $Zi(M) = Zi(W) + 10.98$  $Zi(T) = Zi(W) + 12.52$
D18 to 28 surfaces $Zi(M) = Zi(W) + 8.76$   $Zi(T) = Zi(W) + 12.32$
D29 surface        $Zi(M) = Zi(W)$          $Zi(T) = Zi(W)$ spherical surface shape

| surface R1 | $r1 =$ | −9.434 |
| surface R7 | $r7 =$ | −14.108 |
| surface R8 | $r8 =$ | 90.428 |
| surface R9 | $r9 =$ | 23.555 |
| surface R10 | $r10 =$ | −22.741 |
| surface R11 | $r11 =$ | −63.710 |
| surface R12 | $r12 =$ | −42.543 |
| surface R13 | $r13 =$ | 11.098 |
| surface R14 | $r14 =$ | −8.151 |
| surface R15 | $r15 =$ | 16.437 |
| surface R16 | $r16 =$ | 10.084 |
| surface R17 | $r17 =$ | −7.855 |
| surface R19 | $r19 =$ | −40.482 |
| surface R20 | $r20 =$ | 37.426 |
| surface R21 | $r21 =$ | −26.352 |
| surface R22 | $r22 =$ | 28.292 |
| surface R23 | $r23 =$ | −9.701 |
| surface R24 | $r24 =$ | 14.234 |
| surface R25 | $r25 =$ | 13.022 |
| surface R26 | $r26 =$ | −195.390 |
| surface R27 | $r27 =$ | −6.326 |
| surface R28 | $r28 =$ | −5.283 | aspherical surface shape surface R2  $C02 = -2.97564e-02$  $C20 = -3.39011e-02$
            $C03 = 2.76491e-06$   $C21 = -1.72539e-04$
            $C04 = -1.40076e-05$  $C22 = -3.49153e-05$   $C40 = 4.54806e-06$
            $C05 = 3.12237e-07$   $C23 = 1.75606e-06$    $C41 = -2.22668e-08$
            $C06 = -2.04504e-07$  $C24 = -6.51298e-07$   $C42 = -1.08082e-06$   $c60 = -1.04943e-06$
surface R3  $C02 = -3.72681e-02$  $C20 = -3.39849e-02$
            $C03 = 1.64032e-03$   $C21 = 5.14223e-03$
            $C04 = 2.64464e-03$   $C22 = 1.42512e-03$    $C40 = 5.77577e-03$
            $C05 = 5.02366e-04$   $C23 = -3.18296e-03$   $C41 = 4.02124e-03$
            $C06 = -1.22075e-03$  $C24 = 1.15600e-06$    $C42 = -1.68283e-03$   $c60 = -6.85853e-03$ -continued

| | | | | | |
|---|---|---|---|---|---|
| surface R4 | C02 = −2.20596e−02 | C20 = −2.72110e−02 | | | |
| | C03 = 2.93152e−04 | C21 = 2.06132e−04 | | | |
| | C04 = −3.18608e−05 | C22 = −1.09291e−04 | C40 = −4.15067e−05 | | |
| | C05 = −2.58362e−06 | C23 = −1.19650e−06 | C41 = 1.39803e−06 | | |
| | C06 = −4.96575e−07 | C24 = 1.46209e−06 | C42 = 2.62135e−06 | c60 = −3.27629e−07 | |
| surface R5 | C02 = −3.95617e−03 | C20 = −1.21332e−02 | | | |
| | C03 = 6.60113e−04 | C21 = 5.94331e−04 | | | |
| | C04 = −1.01952e−04 | C22 = −2.79380e−04 | C40 = −1.28979e−04 | | |
| | C05 = 1.49320e−05 | C23 = 4.96433e−05 | C41 = 3.23527e−05 | | |
| | C06 = −2.37006e−06 | C24 = −7.73349e−06 | C42 = −1.67939e−06 | c60 = −1.34001e−06 | |
| surface R6 | C02 = −1.61574e−02 | C20 = −2.09295e−02 | | | |
| | C03 = 1.13451e−05 | C21 = −2.59707e−04 | | | |
| | C04 = −2.68869e−05 | C22 = −5.92532e−05 | C40 = −4.20187e−05 | | |
| | C05 = 2.15716e−06 | C23 = 8.68314e−06 | C41 = 5.11384e−06 | | |
| | C06 = 7.70533e−09 | C24 = −9.77388e−08 | C42 = 1.14362e−06 | c60 = 3.4010e−07 | |

In FIG. 9, the first surface R1 to the seventh surface R7 together constitute the first optical element B1 made integral by a transparent body, and correspond to the first optical portion of the present invention. The eighth surface R8 to the seventeenth surface R17 together constitute the second optical element B2, and the nineteenth surface R19 to the twenty-eighth surface R28 together constitute the third optical element B3. The second and third optical elements are coaxial lens units.

The eighteenth surface R18 is the stop and is disposed more adjacent to the image side than the optical element B1 and between the optical element B2 and the optical element B3. P designates an image pickup element surface which is the last image surface, and is, for example, the image pickup surface of a CCD (image pickup medium) or the like.

Description will hereinafter be made of the imaging action when the object position is at infinity. The light beam from the object first enters the refracting surface R1 of the first optical element B1. In the first optical element B1, the light beam is refracted by the first surface R1, is reflected by the second surface R2, the third surface R3, the fourth surface R4, the fifth surface R5 and the sixth surface R6, is refracted by the seventh surface R7, and emerges from the first optical element B1. The light beam forms an entrance pupil on this side of the optical element B1. Further, the light beam forms a pupil near the fourth surface R4. Also, the light beam is intermediately imaged near the third surface R3.

Next, the light beam enters the refracting surface R8 of the second optical element B2. In the second optical element B2, the light beam is refracted by the eighth surface R8 to the seventeenth surface R17, and emerges from the second optical element B2. Next, the light beam which has emerged from the second optical element B2 passes through the stop R18, and enters the refracting surface R19 of the third optical element B3. In the third optical element B3, the light beam is refracted by the nineteenth surface R19 to the twenty-eighth surface R28, and emerges from the third optical element B3. Lastly, the light beam which has emerged from the third optical element B3 is imaged on the last imaging plane P.

Here, by the focal length change from the wide angle end toward the telephoto end, the spacing between the first optical element B1 and the second optical element B2 is narrowed and the spacing between the second optical element B2 and the third optical element B3 is widened, and thereafter is narrowed, and the spacing between the third optical element B3 and the image surface P is widened. Also, the optical path length of the entire system between the first surface R1 to the image surface P from the wide angle end toward the telephoto end is constant.

In the present embodiment, the stop R18 is provided between the second optical element B2 and the third optical element B3, but the entrance pupil is near the incidence surface because a construction is adopted in which the image of the stop is formed at a negative magnification by the optical system forward of the stop position. Therefore, the effective diameter of the incidence surface can be made small.

Figure 10:
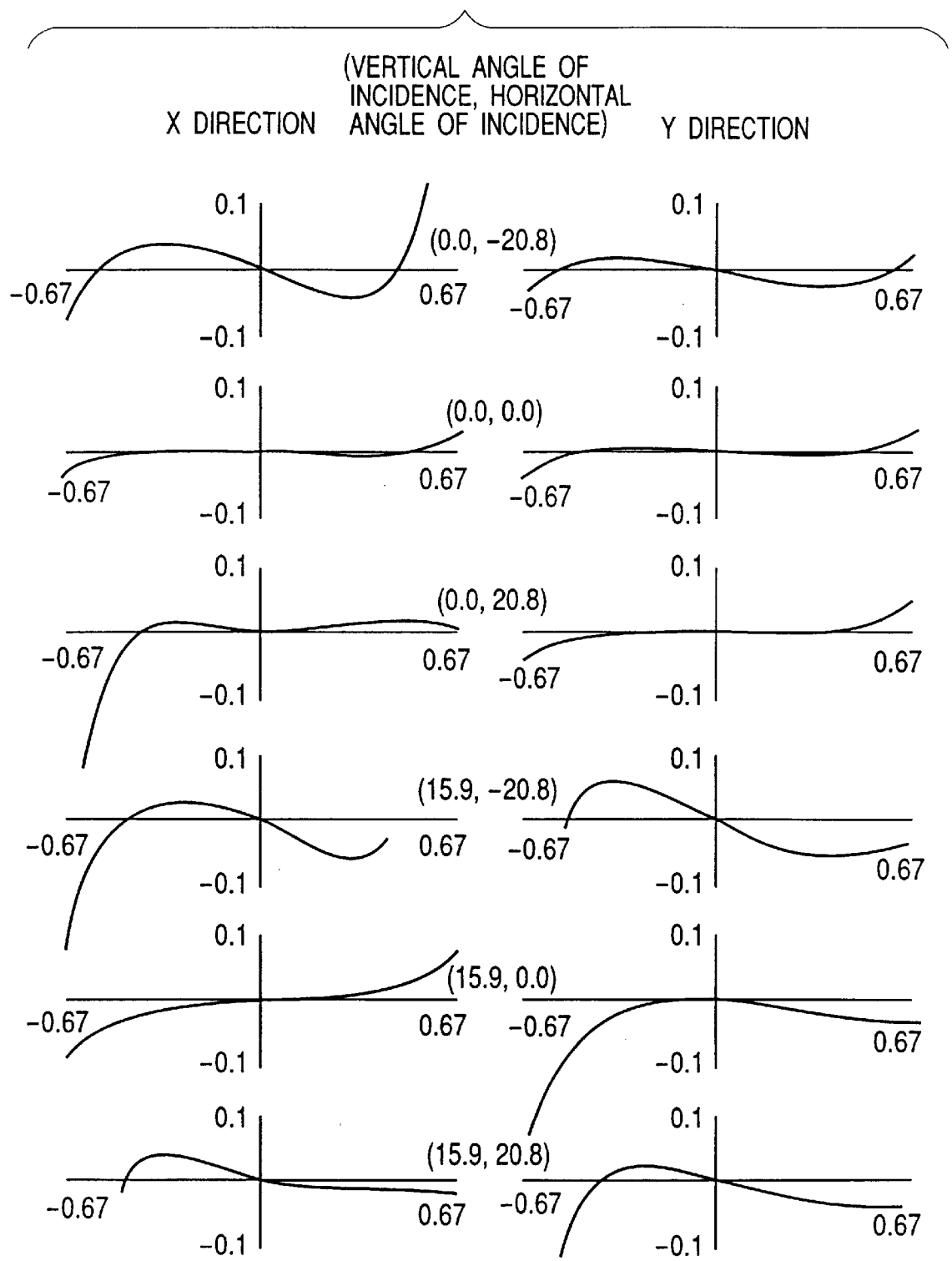
FIG. 10 is the lateral aberration graph (wide angle end) of Embodiment 3.
Figure 11:
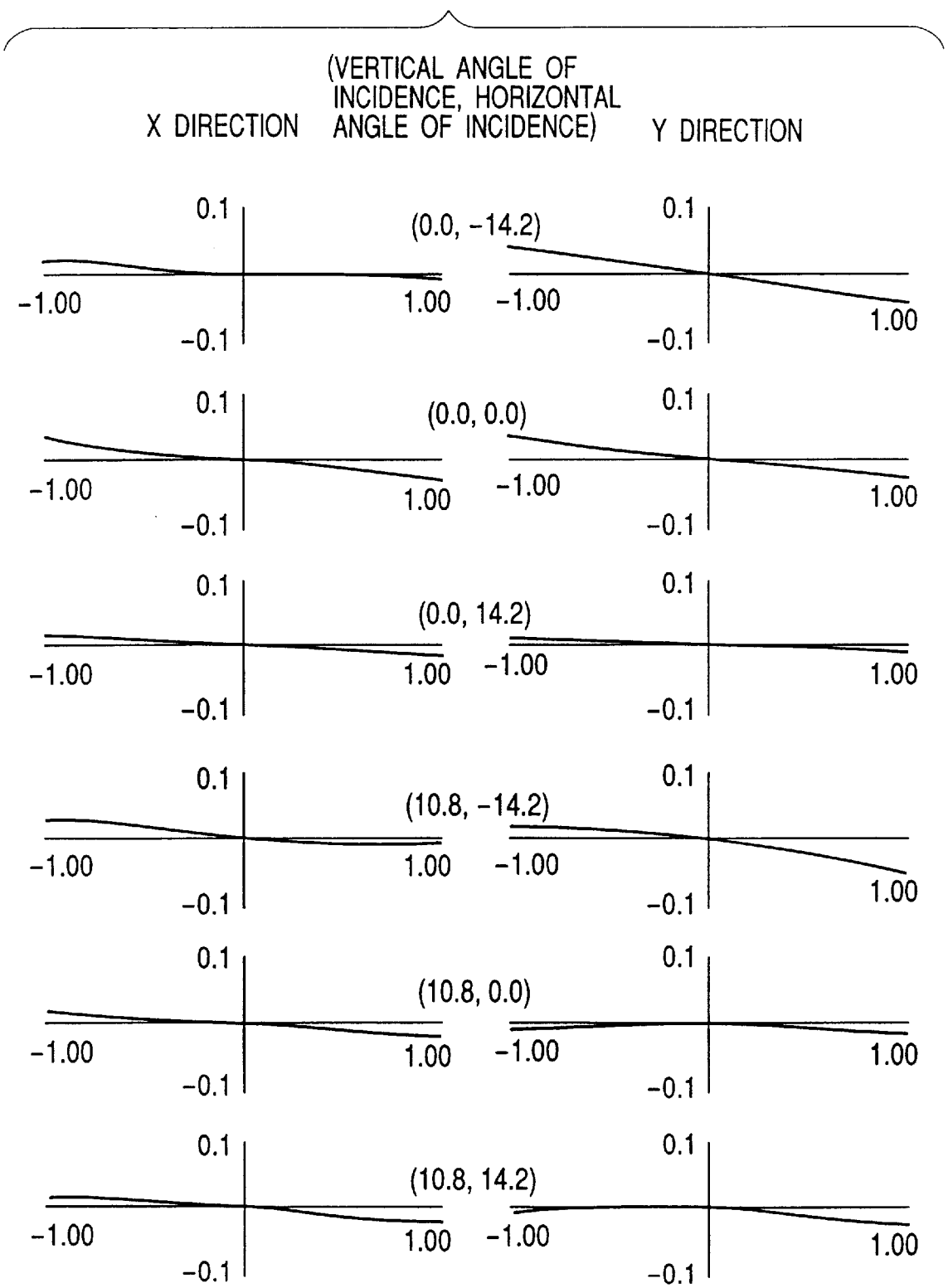
FIG. 11 is the lateral aberration graph (intermediate position) of Embodiment 3.
Figure 12:
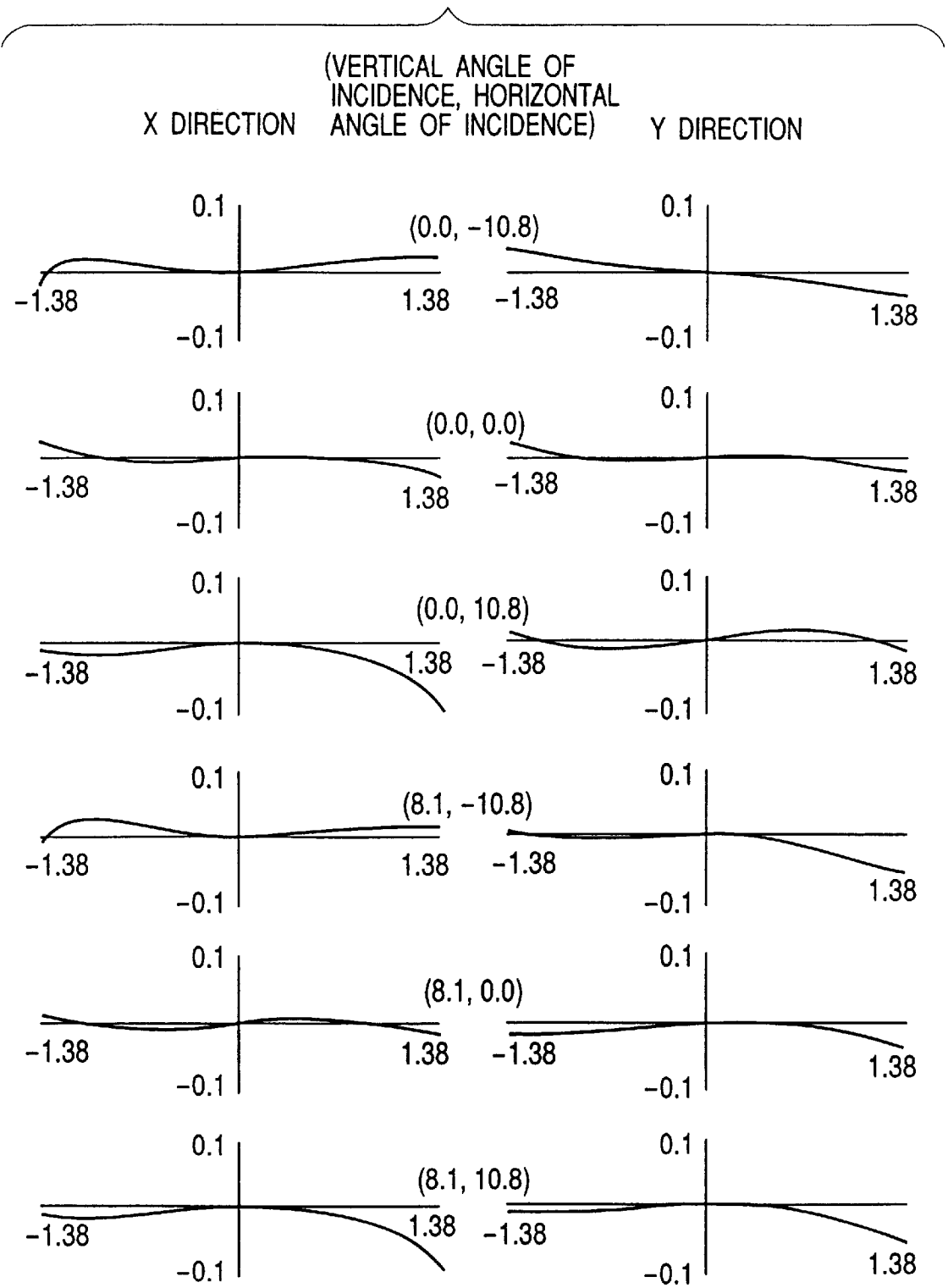
FIG. 12 is the lateral aberration graph (telephoto end) of Embodiment 3.

FIGS. 10, 11 and 12 are the lateral aberration graphs of the present embodiment.

The effect of the present embodiment will now be described.

The stop R18 is provided on the image side of the first optical element B1 and between the second optical element B2 and the third optical element B3, whereby the F number is nearly 3.5 and constant even if the diameter of the stop is fixed and the focal length is changed to 4.67 to 9.27 mm.

Figure 15:
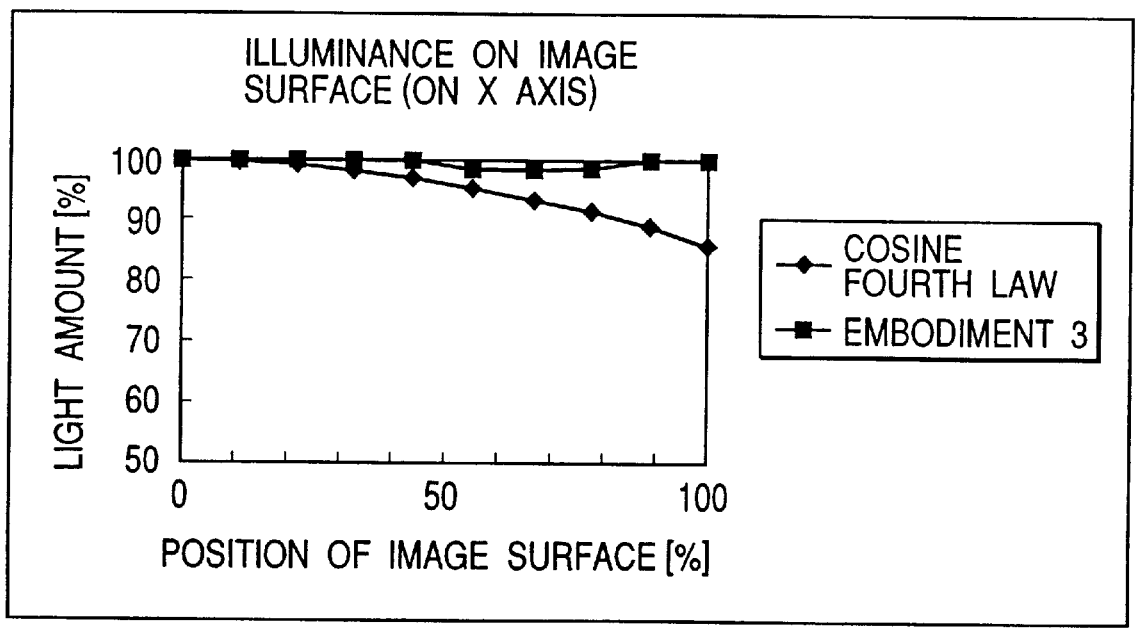
FIG. 15 represents the illuminance on an image surface on the x-axis at the wide angle end of Embodiment 3 of the present invention.

FIG. 15 represents the illuminance on the image surface on the x-axis of the local coordinates on the image surface at the wide angle end of the present embodiment. The axis of ordinates of FIG. 15 represents the illuminance on the image surface when the central light amount is 100, and the axis of abscissas thereof represents the image surface position when half of the image size in x direction is 100. When the stop is in front of the optical system, there is no pupil aberration and therefore, the marginal light amount is reduced in accordance with the cosine fourth law. As shown in FIG. 15, in the present embodiment, the marginal light amount is improved by nearly 15% as compared with the cosine fourth law.

Also, at the wide angle end, the imaging magnification of the entrance pupil at the stop position is 1.4 times. When the stop is most adjacent to the object side of the optical system, the size of the entrance pupil is intactly the diameter of the stop, but in the present embodiment, it is 1.4 times as large as it.

That is, the diameter of the small stop is prevented from becoming extremely small.

Also, by adopting a construction in which the image of the stop is formed at a negative magnification by the optical system forward of the stop position, the effective diameter of the ray on each surface is supported to a small value, and the compactness of each optical element and the entire photographing optical system is achieved.

In the present embodiment, the spacing D from the first surface to the third surface is $$D = D1 + D2 = 20.66,$$

and the average spacing $|(X(0)+X(90))/2|$ from the first surface to the entrance pupil is, at the wide angle end, $$|(X(0)+X(90))/2| = |(-5.64-2.93)/2| = 4.29 < D,$$

and at the intermediate position, $$|(X(0)+X(90))/2|=|(-5.54-2.82)/2|=4.28<D,$$

and at the telephoto end, $$|(X(0)+X(90))/2|=|(-6.06-3.35)/2|=4.71<D.$$

Thus, the optical system of Embodiment 2 satisfies conditional expression (1) in the entire zoom area, and since the entrance pupil is located near the optical surface most adjacent to the object side, a reduction in the effective diameter of the optical system is achieved.

In the present embodiment, the direction of movement of the optical elements B2 and B3 need not be parallel to the direction of the reference axis entering and emerging from the two optical elements, but for example, the direction of the reference axis entering the optical system and the direction of movement of the movable optical elements may form a certain angle such as 30°, 45° or 60° therebetween.

In the present invention, by the use of a plurality of optical elements each having two refracting surfaces and a plurality of reflecting surfaces formed on the surface of a transparent body constituting Embodiment 1 and a plurality of optical elements each integrally formed with a plurality of reflecting surfaces comprising such a surface reflecting mirror as constitutes Embodiment 2, it is also possible to construct a reflection type zoom optical system in which the relative position of at least two of those optical elements is changed to thereby affect zooming.

Again in that case, by the stop being provided between the optical elements, the F number can be made substantially constant even if the stop diameter is fixed during zooming, and it is possible to prevent a reduction in the marginal light amount as compared with the case of a pre-stop.

It is also possible to construct a zoom optical system by the use of an optical element integrally formed with a plurality of reflecting surfaces comprising such a surface reflecting mirror as constitutes Embodiment 2, instead of an optical element having two refracting surfaces and a plurality of reflecting surfaces formed on the surface of a transparent body constituting Embodiment 3. Again in that case, by the stop being provided between the optical elements, the F number can be made substantially constant even if the stop diameter is fixed during zooming, and it is possible to prevent a reduction in the marginal light amount as compared with the case of the pre-stop.

Also, an optical system of a single focus can be achieved if a zoom optical system is fixed in a certain zoom state. That is, each embodiment of the present invention is a reflection type zoom optical system, but likewise a reflecting optical system of a single focus can be constructed. Again in that case, by providing the stop between the optical elements, it is possible to prevent a reduction in the marginal light amount.

Also, in the embodiments of the present invention, the first optical element is fixed, but as in the prior-art zoom optical system, it is also possible to move the first optical element to thereby affect focusing.

As described above, by adopting a construction in which the image of the stop is formed at a negative magnification by the optical system forward of the stop position, there can be achieved an image pickup optical system which has a wide angle of view and yet contrives a reduction in the effective diameter of the optical system, and an image pickup apparatus using the same.

Besides, the image of an object is formed through a plurality of optical elements and a stop is provided between the optical elements, whereby there is obtained the effect that a reduction in the marginal light amount can be prevented as compared with the case of a pre-stop and also the diameter of a small stop can be prevented from becoming extremely small.

There is further obtained the effect that when the relative position of at least two of the plurality of optical elements is changed to thereby effect zooming, a stop is provided between the optical elements, whereby the F number can be made substantially constant even if the stop diameter is fixed during zooming.

What is claimed is:

1. An optical system comprising:

a first optical part disposed most adjacent to an object side, said first optical part having three or more optical surfaces, of which at least one is a reflecting surface; and an aperture stop disposed more adjacent to an image side than said first optical part;

wherein when the spacing from a first optical surface to a third optical surface as counted from the object side of said first optical part is defined as D and the spacing from said first optical surface to an entrance pupil at an azimuth $\xi$ degrees is defined as $X(\xi)$, the following condition is satisfied:

$$|(X(0)+X(90))/2|<D.$$

2. The optical system of claim 1, wherein said first optical part is a solid optical block having two refracting surfaces and at least one reflecting surface.

3. The optical system of claim 1, wherein said first optical part is a hollow optical block having at least three reflecting surfaces.

4. The optical system of claim 1, wherein at least one of said three or more optical surfaces is a curved surface of which the reference axis and the surface normal do not coincide with each other, and the reference axis is defined by the route of a ray of light passing through the center of said aperture stop and the center of the image surface.

5. The optical system of claim 4, wherein said at least one reflecting surface is a curved surface of which the reference axis and the surface normal do not coincide with each other.

6. The optical system of claim 4, wherein at least one of said three or more optical surfaces is a rotation-asymmetrical aspherical surface.

7. The optical system of claim 1, further comprising:

a second optical part disposed more adjacent to the image side than said aperture stop.

8. The optical system of claim 6, wherein focal length change is effected by relatively changing the positions of said first optical part and said second optical part.

9. The optical system of claim 1, further comprising:

a second optical part disposed more adjacent to the image side than said first optical part and more adjacent to the object side than said aperture stop; and a third optical part disposed more adjacent to the image side than said aperture stop;

wherein focal length change is effected by changing the positions of at least two of said first to third optical parts.

10. The optical system of claim 9, wherein said first optical part is stationary during the focal length change.

11. An optical apparatus provided with the optical system of any one of claims 1 to 10.

* * * * *

UNITED STATES PATENT AND TRADEMARK OFFICE
CERTIFICATE OF CORRECTION

PATENT NO. : 6,270,224 B1
DATED : August 7, 2001
INVENTOR(S) : Toshihiro Sunaga et al.

It is certified that error appears in the above-identified patent and that said Letters Patent is hereby corrected as shown below:

Column 1,
Line 41, "change d" should read -- changed --; and
Line 42, "t he" should read -- the --.

Column 7,
Line 7, "condition" should read -- conditions --.

Column 12,
Line 55, "a half" should read -- one half --; and
Line 57, "not pupil" should read -- no pupil --.

Signed and Sealed this

Fifth Day of March, 2002

Attest:

JAMES E. ROGAN
Attesting Officer
Director of the United States Patent and Trademark Office